US008689586B2

(12) United States Patent
Hirayama et al.

(10) Patent No.: US 8,689,586 B2
(45) Date of Patent: Apr. 8, 2014

(54) GLASS-MELTING DEVICE FOR PRODUCING GLASS FIBER AND METHOD FOR PRODUCING GLASS FIBER

(75) Inventors: Norio Hirayama, Fukushima (JP);
Naohiro Miyanaga, Fukushima (JP);
Masahiko Takahashi, Fukushima (JP);
Kentarou Ogawa, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 49 days.

(21) Appl. No.: 13/255,463

(22) PCT Filed: Mar. 8, 2010

(86) PCT No.: PCT/JP2010/053799
§ 371 (c)(1),
(2), (4) Date: Oct. 18, 2011

(87) PCT Pub. No.: WO2010/104038
PCT Pub. Date: Sep. 16, 2010

(65) Prior Publication Data
US 2012/0167633 A1 Jul. 5, 2012

(30) Foreign Application Priority Data

Mar. 9, 2009 (JP) ................. P2009-055571
May 25, 2009 (JP) ................. P2009-125725
Jul. 9, 2009 (JP) ................. P2009-162901

(51) Int. Cl.
*C03B 37/085* (2006.01)
(52) U.S. Cl.
USPC ............. 65/134.2; 65/134.9; 65/469; 65/471; 65/493; 65/499
(58) Field of Classification Search
USPC ................. 65/471, 492, 493, 495, 499, 134.2, 65/134.9
See application file for complete search history.

(56) References Cited

U.S. PATENT DOCUMENTS 3,406,021 A * 10/1968 Day et al. .......... 65/474
3,689,046 A * 9/1972 De Bie et al. .......... 266/210
(Continued)

FOREIGN PATENT DOCUMENTS

DE 3110085 A1 9/1982
DE 10055967 A1 * 5/2002
(Continued)

OTHER PUBLICATIONS

International Preliminary Report on Patentability and Written Opinion issued in International Patent Application No. PCT/JP2010/053796 dated Oct. 27, 2011.
(Continued)

*Primary Examiner* — Queenie Dehghan
(74) *Attorney, Agent, or Firm* — Morgan, Lewis & Bockius LLP

(57) ABSTRACT

A glass-melting device for producing glass fibers capable effectively reducing inclusion of bubbles into glass fibers to be spun, and a method for producing glass fibers using the same are provided.

A glass-melting device 100 for producing glass fibers comprises: a first glass-melting tank 12; a conduit 14 extending downward from the first glass-melting tank 12; a sucking device 18 for exposing the first glass-melting tank 12 to a reduced-pressure atmosphere; a second glass-melting tank 20 provided on a lower portion of the conduit 14 and exposed to an atmospheric-pressure atmosphere; and a bushing 22 provided at a bottom portion of the second glass-melting tank 20 and equipped with a number of nozzles 22a.

17 Claims, 20 Drawing Sheets

(56) References Cited

U.S. PATENT DOCUMENTS

| | | | |
|---|---|---|---|
| 3,998,686 A * | 12/1976 | Meiling et al. ................... 117/33 |
| 4,241,904 A | 12/1980 | Nagashima et al. |
| 4,270,941 A * | 6/1981 | Babbitt ........................... 65/474 |
| 4,541,865 A * | 9/1985 | Sherwood ........................ 75/510 |
| 4,738,938 A | 4/1988 | Kunkle et al. |
| 5,352,258 A * | 10/1994 | DeGreve et al. ................. 65/474 |
| 6,286,337 B1 | 9/2001 | Palmquist |
| 6,405,564 B1 | 6/2002 | Takei et al. |
| 2005/0268663 A1 | 12/2005 | Tomita et al. |
| 2008/0050609 A1 | 2/2008 | Abe et al. |
| 2008/0083250 A1* | 4/2008 | Nagno et al. ................ 65/374.12 |
| 2008/0120997 A1* | 5/2008 | Takeshita et al. ................ 65/157 |

FOREIGN PATENT DOCUMENTS

| | | |
|---|---|---|
| DE | 10116960 C1 | 8/2002 |
| DE | 10200232 C1 | 1/2003 |
| DE | 10200233 C1 | 4/2003 |
| EP | 0297404 A1 | 1/1989 |
| EP | 0759524 A1 | 2/1997 |
| EP | 0775671 A1 | 5/1997 |
| EP | 0963955 A1 | 12/1999 |
| EP | 0989099 A1 | 3/2000 |
| JP | 57-149839 | 9/1982 |
| JP | 61-072647 A | 4/1986 |
| JP | 02-042777 B2 | 9/1990 |
| JP | 02-221129 A | 9/1990 |
| JP | H03-033020 A | 2/1991 |
| JP | 05195045 A * | 8/1993 |
| JP | 11050131 A * | 2/1999 |
| JP | 11-171554 A | 6/1999 |
| JP | 11-236237 A | 8/1999 |
| JP | 2000-128549 A | 5/2000 |
| JP | 2000-302456 A | 10/2000 |
| JP | 2002-087826 | 3/2002 |
| JP | 2003-192373 | 7/2003 |
| JP | 2006-206439 | 8/2006 |
| JP | 2007-022862 A | 2/2007 |
| JP | 2008-266072 | 11/2008 |
| WO | 2005/009911 A2 | 2/2005 |
| WO | 2006/059576 | 6/2006 |
| WO | 2006/095523 A1 | 9/2006 |

OTHER PUBLICATIONS

Search Report issued in European Patent Application No. 75 789.9 dated Jul. 13, 2012.
International Search Report for PCT/JP2010/053799.
Extended Search Report issued in corresponding European Patent Application No. 10750791.5 dated Sep. 17, 2012.
Office Action issued in counterpart U.S. Appl. No. 13/255,459 dated Jun. 5, 2013.

* cited by examiner

Fig.9
(a)
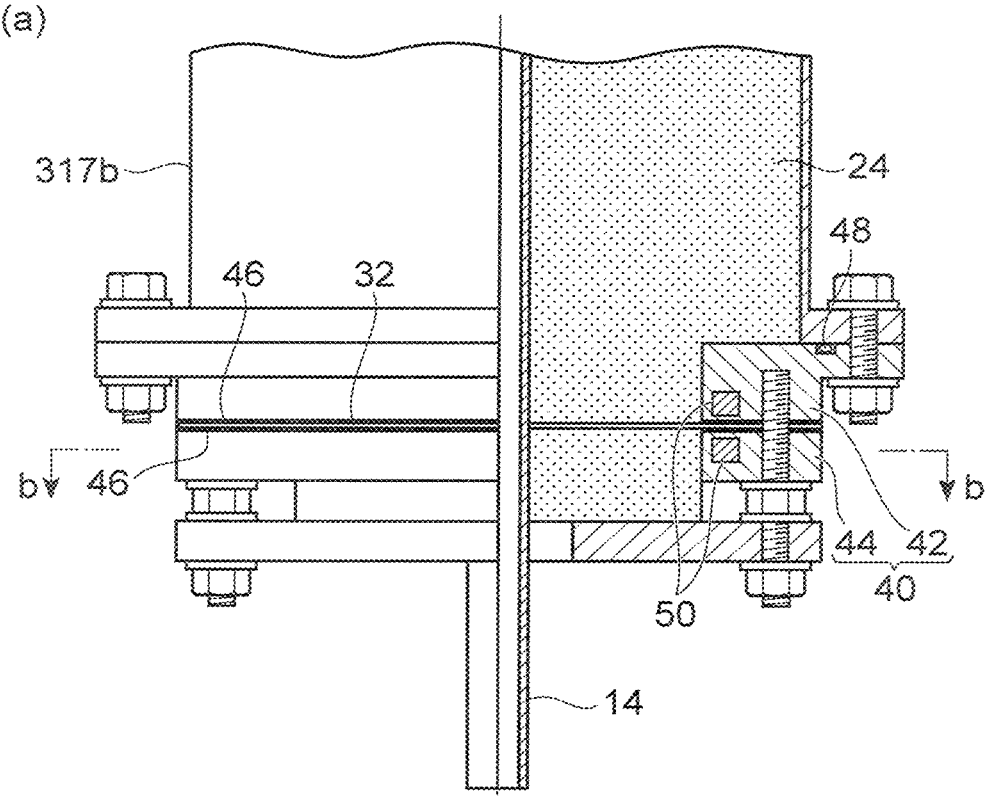
(b)
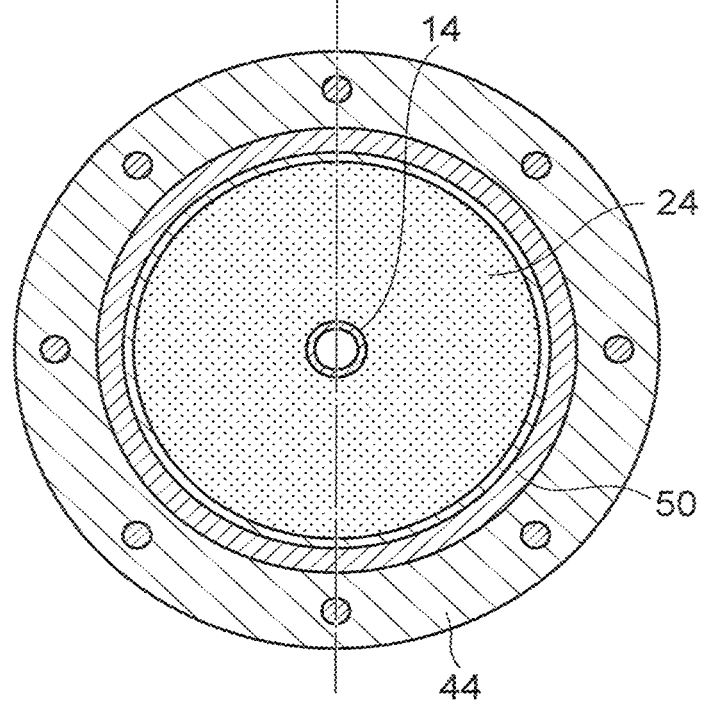

Fig.20
(a)
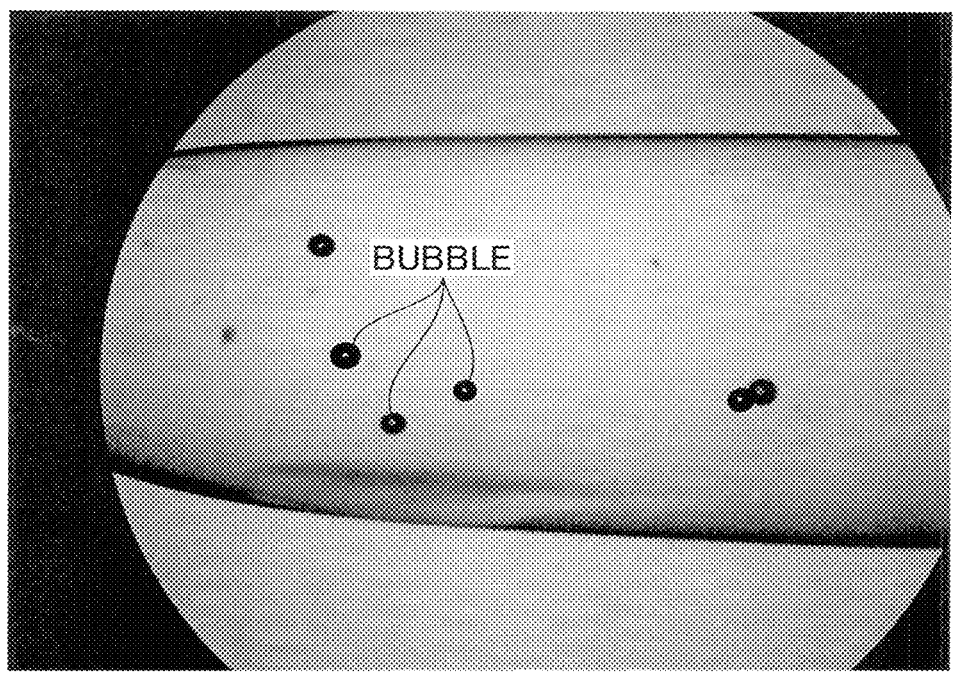
(b)
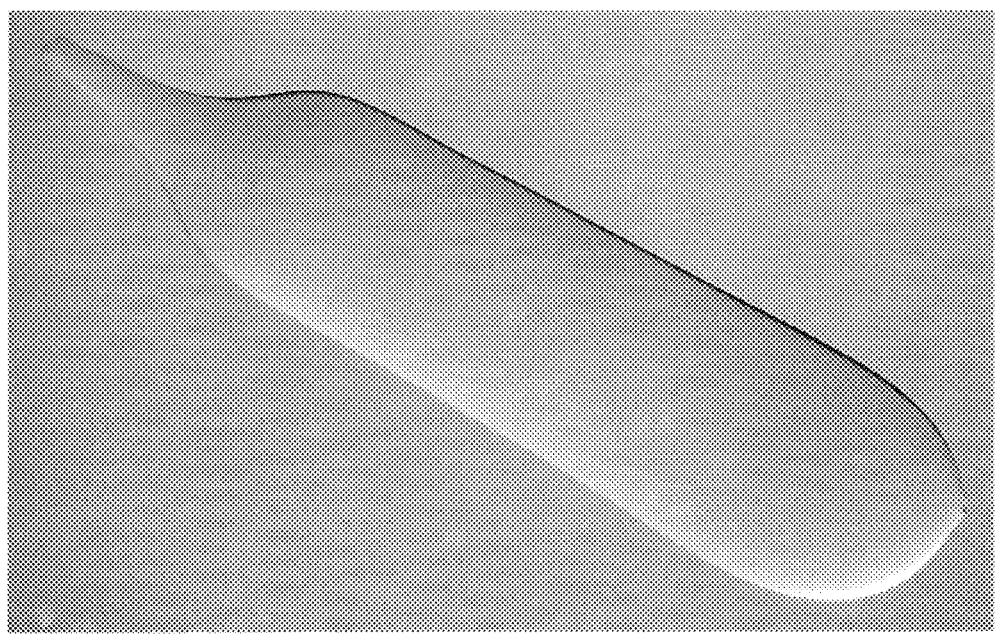

GLASS-MELTING DEVICE FOR PRODUCING GLASS FIBER AND METHOD FOR PRODUCING GLASS FIBER

CROSS-REFERNCE TO RELATED TO APPLICATIONS

The present application is a U.S. National Phase Application of International Application PCT/JP2010/053799, filed Mar. 8, 2010, which claims the benefit of Japanese Patent Application Nos. 2009-055571, filed Mar. 9, 2009, 2009-125725, May 25, 2009, and 2009-162901, filed Jul. 9, 2009, which is hereby incorporated by reference in their entirety.

TECHNICAL FIELD

The present invention relates to a glass-melting device for producing glass fibers which melts glass raw materials for spinning glass fibers, and a method for producing glass fibers using the same.

BACKGROUND ART

A direct melt process and a marble melt process have been used in the production of glass fibers as typical melting methods for forming a plurality of glass fibers by fiberizing a molten glass, gathering the glass fibers, and spinning them as glass fiber yarn. In the direct melt process, powders or particulate matters of various mineral matters are mixed as glass raw materials, injected into a melting furnace, and melted to produce a molten glass. On the other hand, in the marble melt process, glass gobs referred to as marbles prepared by solidifying a molten glass are remelted to produce a molten glass (for example, see Patent Literature 1).

For spinning glass fibers, solid raw materials such as glass raw materials of mineral matters or glass gobs are melted as described above. However, bubbles are unfavorably generated during melting. The generated bubbles may be bubbles caused when raw materials are injected into a melting furnace, bubbles of volatile components (carbonate, sulfate, oxide) contained in the raw materials, bubbles generated at an interface of a zirconia brick of the melting furnace, or bubbles generated by reaction with platinum in the melting furnace.

Due to these bubbles, some bubbles may exist in glass fibers during subsequent spinning. When this happens, glass fiber yarn may be unfavorably cut during spinning or mechanical strength or electrical insulation of a molded article using spun glass fiber yarn as a reinforcement material may be reduced.

Thus, the bubbles are reduced by adding clarifying agent to the glass raw materials or solid raw materials or attaching a valve to an outlet of the melting furnace as disclosed in Patent Literature 1.

CITATION LIST

Patent Literature

[Patent Literature 1] Japanese Patent Laid-Open No. 2003-192373

SUMMARY OF INVENTION

Technical Problem

However, adding clarifying agent is not favorable in terms of environment and cost. Further, the inclusion of bubbles cannot be effectively reduced by attaching the valve to the outlet of the melting furnace as disclosed in Patent Literature 1.

The present invention has been made in view of the above-described circumstances. An object of the present invention is to provide a glass-melting device for producing glass fibers capable of effectively reducing the inclusion of bubbles in glass fibers to be spun, and a method for producing glass fibers using the same.

Solution to Problem

A glass-melting device for producing glass fibers according to an aspect of the present invention includes: a first glass-melting tank; a conduit extending downwardly from the first glass-melting tank; a first sucking device for exposing the first glass-melting tank in a reduced-pressure atmosphere; a second glass-melting tank provided on a lower portion of the conduit and exposed in an atmospheric-pressure atmosphere; and a bushing provided on a bottom portion of the second glass-melting tank and having a large number of nozzles.

In this glass-melting device, bubbles can be removed from molten glass by melting the glass in the first glass-melting tank under the reduced-pressure atmosphere. Thus, the inclusion of bubbles into glass fibers to be spun can be effectively reduced.

It is preferable that each of the first glass-melting tank, the conduit, the second glass-melting tank, and the bushing have heating means for adjusting the temperature separately. By separately adjusting the temperature of each of the first glass-melting tank, the conduit, the second glass-melting tank, and the bushing, the most appropriate temperature condition can be provided in each area. Thus, the generation of bubbles due to reboiling can be suppressed.

It is preferable that an electrode part be provided on an upper portion of the conduit or the first melting tank, and a lower portion of the conduit. It is also preferable that the conduit be heated when a current is applied. In producing the glass fibers, the weight of spun glass per unit time is small and the brought-in heat is also small, and accordingly, the molten glass may be cooled and solidified in the middle of the conduit. Thus, by heating the conduit itself when a current is applied from the electrode part, the molten glass can be prevented from being cooled.

It is preferable that a conduit branch part branched from the conduit and extending upwardly be formed on the lower portion of the conduit, and an electrode part be provided on the upper portion of the conduit or the first melting tank and the conduit branch part. It is also preferable that the conduit and the conduit branch part be heated when a current is applied. Since the electrode part is provided on the conduit branch part branched from the lower end portion of the conduit, a predetermined distance can be provided between a connection part connected to the electrode part and the conduit. Accordingly, the temperature of the lower end portion of the conduit can be stably raised to a set temperature. Thus, the temperature of the molten glass introduced into the conduit can be appropriately raised.

It is preferable that the first glass-melting tank and the conduit be covered with a decompression housing in which the pressure is reduced by the first sucking device. Accordingly, the pressure in the first glass-melting tank can be easily controlled to be reduced. Also, since buckling of the conduit due to decompression is not easily occurred by covering the conduit with the decompression housing, the conduit can be thinned. Particularly, it is effective when the conduit is made of an expensive material such as platinum.

It is preferable that the lower portion of the conduit and the decompression housing be connected to each other via a flange having water-cooled tubes. It is also preferable that the conduit and the decompression housing be hermetically sealed by a packing such as an O-ring. However, at this time, the temperature of a connection part between the conduit and the decompression housing needs to be controlled to be less than a heatproof temperature of the packing. Since the temperature of the conduit becomes high, the conduit and the decompression housing are connected via the flange having the water-cooled tubes. Thus, they can be hermetically sealed using the packing.

It is preferable that at least inner surfaces of the first glass-melting tank, the conduit, and the second glass-melting tank be made of platinum or platinum-alloy. When these are made of refractory bricks, foreign matters may be mixed due to interface degradation of the molten glass. However, the inclusion of the foreign matters can be minimally suppressed by forming at least their inner surfaces using platinum or platinum-alloy.

Not only the conduit but also the first glass-melting tank and the second glass-melting tank can be heated when a current is applied.

It is preferable that a plurality of bushings be provided on the lower portion of the second glass-melting tank. Accordingly, the productivity can be improved. Even when there is something wrong with one bushing, spinning can be continued via other bushings and thus glass fibers can be stably manufactured.

It is preferable that the glass-melting device include a third glass-melting tank having a bushing with a large number of nozzles provided at the bottom and exposed in the atmospheric-pressure atmosphere, and a communication tube for communicating between the second glass-melting tank and the third glass-melting tank. The second glass-melting tank and the third glass-melting tank respectively conduct spinning. Even when there is something wrong with the second glass-melting tank or the third glass-melting tank, the spinning can be continued using the bushing on the lower portion of the melting tank in which failure does not occur by controlling the temperature of the bushing on the lower portion of the melting tank in which failure occurs and stopping the bushing to continue spinning. Thus, the glass fibers can be manufactured stably.

A method for producing glass fibers according to another aspect of the present invention uses the glass-melting device for producing glass fibers as described above. This method includes: injecting molten glass, glass gobs, or glass raw materials into the first glass-melting tank; melting the molten glass, glass gobs, or glass raw materials by heating the first glass-melting tank under the reduced-pressure atmosphere; introducing glass which is melted by heating the conduit, the second glass-melting tank, and the bushing into the second glass-melting tank; and spinning the molten glass from the nozzles of the bushing for producing glass fibers.

According to this method for producing glass fibers, bubbles can be removed from the glass by melting the glass in the first glass-melting tank under the reduced-pressure atmosphere. Thus, the inclusion of bubbles into the glass fibers to be spun can be effectively reduced.

It is preferable that a liquid level of the molten glass in the first glass-melting tank be higher than a liquid level of the molten glass in the second glass-melting tank by 150 cm or more. Due to such height, the liquid level of the molten glass in the first glass-melting tank can be reduced by 0.4 atmosphere or more relative to atmospheric pressure. Under such reduced-pressure atmosphere, gas in the molten glass is continuously dispersed in existing bubbles and a bubble diameter is rapidly increased. Thus, a large defoaming effect can be obtained.

In other words, when the length of the conduit and the depth of the molten glass in the first glass-melting tank are appropriately set such that the liquid level of the molten glass in the first glass-melting tank is reduced by approximately 0.4 to 0.9 atmosphere relative to atmospheric pressure, the large defoaming effect can be obtained.

It is preferable that a suction amount of the first sucking device be controlled such that a pressure difference between the pressure in the reduced-pressure atmosphere in which the first glass-melting tank is exposed and the atmospheric pressure is constant. By controlling the pressure difference to be constant, fluctuation in the liquid level of the molten glass due to tiny variations of the atmospheric pressure can be suppressed.

It is preferable that an injection amount of the molten glass, glass gobs, or glass raw materials into the first glass-melting tank be controlled based on the liquid level of the molten glass in the second glass-melting tank. Also, the area of the liquid level of the molten glass in the second glass-melting tank may be equal to or larger than the area of the liquid level of the molten glass in the first glass-melting tank. Thus, fluctuations in the liquid level in the second glass-melting tank can be reduced, and the generation of bubbles brought from a contact surface between a wall surface of the second glass-melting tank and the molten glass can be suppressed. Further, variations in the diameter of the glass fiber to be spun can be suppressed, and variations in the strength or electric characteristics of a molded article due to count variations of the glass fiber can be also suppressed.

In the glass-melting tank for producing glass fibers, the weight of spun glass per unit time is small in producing the glass fibers. Accordingly, the molten glass is cooled and solidified in the conduit when the conduit is not heated. Therefore, the conduit is heated in starting the glass-melting device for producing glass fibers. However, due to the temperature rise during heating, the conduit and the decompression housing covering the conduit are expanded in the longitudinal direction. The extended amounts of the conduit and the decompression housing due to thermal expansion are largely different from each other because a large difference in temperature between the conduit and the decompression housing is generated and their coefficients of thermal expansion are different from each other. Thus, the conduit and the decompression housing may be damaged due to the difference of the extended amounts.

An another object of the present invention is to provide a glass-melting device for producing glass fibers capable of preventing damage of the conduit and the decompression housing caused by heating of the conduit, and a method for producing glass fibers using the same.

The glass-melting device for producing glass fibers according to the aspect of the present invention further includes the decompression housing covering the first glass-melting tank and the conduit in which the pressure is reduced by the first sucking device, and heating devices for heating the first glass-melting tank, the conduit, the second glass-melting tank, and the bushing separately. An extendable housing part which is extendable and retractable is provided in the decompression housing.

In the glass-melting device for producing glass fibers according to the aspect of the present invention, bubbles can be removed from the molten glass by melting the glass in the first glass-melting tank under the reduced-pressure atmosphere. Therefore, the inclusion of bubbles into glass fibers to be spun can be effectively reduced. The conduit and the decompression housing of which temperatures are raised by heating of the conduit have different extendable amounts due to the difference of their coefficients of thermal expansion and the difference of their temperatures. However, by extending or retracting the decompression housing the extendable housing part, their lengths can be the same. Thus, a load applied on the conduit and the decompression housing due to the difference of their extendable amounts when the temperatures are raised can be reduced, and therefore the damage of the conduit and the decompression housing can be prevented.

It is preferable that a heat insulating material be accommodated in the decompression housing and at least part of the heat insulating material be an elastic heat insulating material having elasticity. Due to such a structure, the elastic heat insulating material is expanded with thermal expansion of the conduit and the decompression housing. Thus, the reduction of heat-insulating efficiency caused by generation of a gap in the heat insulating material can be prevented.

It is preferable that a partition member for partitioning the heat insulating material be provided in the decompression housing. Due to such a structure, the heat insulating material arranged on the upper portion of the partition member is supported by the partition member. Accordingly, a load applied on the extendable housing part provided in the decompression housing can be reduced. Further, since the position of the gap in the heat insulating material caused by the thermal expansion of the conduit and the decompression housing is specified, the elastic heating insulating material can be inserted at an appropriate position.

It is preferable that the elastic heat insulating material be accommodated in the vicinity of the partition member. When the conduit and the decompression housing are thermally expanded, the gap is generated between the heat insulating materials partitioned by the partition member. By accommodating the elastic heat insulating material in the vicinity of the partition member, the gap of the heat insulating material can be appropriately buried.

It is preferable that a heat insulating material insertion opening for inserting the heat insulating material in the decompression housing be formed in the decompression housing. Due to such a structure, even when the gap is generated in the heat insulating material because of the thermal expansion of the conduit and the decompression housing, the heat insulating material can be inserted in the decompression housing from the outside. Thus, the reduction of heat-insulating efficiency can be suppressed.

It is preferable that an extendable conduit part for extending and retracting the conduit by being bent or curved be formed in the conduit. Due to such a structure, the difference in length between the conduit and a part covering the conduit (conduit housing part) in the conduit housing is corrected. Thus, the lengths of the conduit and the conduit housing can be the same.

A method for producing glass fibers according to a further aspect of the present invention using the glass-melting device for producing glass fibers as described above includes: a step (1) of injecting molten glass, glass gobs, or glass raw materials into at least one of the first glass-melting tank and the second glass-melting tank as a glass fiber production starting step; a step (2) of heating at least one of the first glass-melting tank and the second glass-melting tank and melting the molten glass, glass gobs, or glass raw materials for closing a lower end portion of the conduit by the molten glass; a step (3) of exposing the first glass-melting tank to the reduced-pressure atmosphere; and a step (4) of heating the first glass-melting tank, the conduit, the second glass-melting tank, and the bushing, and spinning the molten glass from nozzles of the bushing. In the glass fiber producing starting step, an extendable amount of an extendable housing is adjusted based on a relationship between a thermal expansion amount of the conduit and a thermal expansion amount of the decompression housing.

To effectively perform the step (2) of closing the lower end portion of the conduit by the molten glass, it is preferable that the molten glass, glass gobs, or glass raw materials be injected into the second glass-melting tank in the step (1) and the second glass-melting tank be heated in the step (2). Further, to effectively perform the glass fiber production starting step, it is preferable that the molten glass, glass gobs, or glass raw materials also be injected into the first glass-melting tank such that a large amount thereof are not delivered into the conduit in the step (1) and the first glass-melting tank also be heated in the step (2). It is most preferable that the conduit also be heated in the step (2).

In the method for producing glass fibers according to the further aspect of the present invention, the lower end portion of the conduit is closed by the molten glass as the glass fiber production starting step to hermetically close the first glass-melting tank. Accordingly, the first glass-melting tank can be exposed to the reduced-pressure atmosphere. Since bubbles can be removed from the molten glass by melting the glass in the first glass-melting tank under the reduced-pressure atmosphere, inclusion of the bubbles into glass fibers to be spun can be effectively reduced. The conduit and the decompression housing of which temperatures are raised by heating of the conduit have different extendable amounts due to the difference of their coefficients of thermal expansion and the difference of their temperatures. However, by extending or retracting the decompression housing by the extendable housing part, their lengths can be coincident. Thus, the load applied on the conduit and the decompression housing due to the difference of their extendable amounts by rise of their temperatures can be reduced, and therefore the damage of the conduit and the decompression housing can be prevented.

At this time, it is preferable that the heat insulating material be inserted in the decompression housing with the rise of temperatures of the conduit and the decompression housing. When the temperatures of the conduit and the decompression housing are raised, the gap is generated in the heat insulating material due to thermal expansion of the conduit and the decompression housing. However, by inserting another heat insulating material in the decompression housing from the outside, the reduction of heat-insulating efficiency can be suppressed.

When a liquid level of the molten glass is varied in the glass-melting tank, bubbles are often generated from a contact surface between a wall surface of the glass-melting tank and the molten glass. However, in the glass-melting device for producing glass fibers, the liquid level of the molten glass in the first glass-melting tank is varied due to the pressure variations in the first glass-melting tank.

Accordingly, it is important how to suppress the pressure variations in the first glass-melting tank when solid raw materials are injected in the first glass-melting tank.

A further object of the present invention is to provide a glass-melting device for producing glass fibers capable of suppressing pressure variations in the first glass-melting tank when solid raw materials are injected in the first glass-melting tank, and a method for producing glass fibers using the same.

The glass-melting device for producing glass fibers according to the aspect of the present invention further includes: a decompression housing covering the first glass-melting tank and the conduit, in which the pressure is reduced by the first sucking device; a injection container connected to the decompression housing for accommodating solid raw materials to be injected into the first glass-melting tank; an injection container including a first opening-closing mechanism provided on an inlet side of the solid raw materials and a second opening-closing mechanism provided on an outlet side of the solid raw materials; and a second sucking device for reducing the pressure in the injection container.

In the glass-melting device for producing glass fibers according to the aspect of the present invention, bubbles can be removed from the molten glass by melting the solid raw materials in the first glass-melting tank under the reduced-pressure atmosphere. Therefore, the inclusion of bubbles into glass fibers to be spun can be effectively reduced. Then, the solid raw materials are injected into the injection container while the second opening-closing mechanism is closed, and the pressure in the injection container is reduced while the first opening-closing mechanism and the second opening-closing mechanism are closed. Subsequently, the solid raw materials are injected into the first glass-melting tank by opening only the second opening-closing mechanism. Since the solid raw materials are injected into the first glass-melting tank without exposing the first glass-melting tank to the atmospheric pressure, the pressure variations in the first glass-melting tank can be suppressed. Thus, the variations of the liquid level in the first glass-melting tank can be reduced, and therefore the generation of bubbles from the contact surface between the wall surface of the first glass-melting tank and the molten glass can be suppressed. Since the variations of the liquid level in the first glass-melting tank can be suppressed, the variations of the liquid level of the molten glass in the second glass-melting tank can be also suppressed. Accordingly, the generation of bubbles brought from the contact surface between the wall surface of the second glass-melting tank and the molten glass can be also suppressed. Thus, variations in the diameter of the glass fiber to be spun can be suppressed, and variations in the strength or electric characteristics of a molded article due to count variations of the glass fiber can be suppressed.

It is preferable that a melting-tank inner container having an opening and arranged at the position where solid raw materials are injected from the injection container be provided in the first glass-melting tank. When the solid raw materials are directly injected into the first glass-melting tank, the raw materials may not remain for an enough time to remove bubbles from the molten glass because of fast flow on the bottom portion of the first glass-melting tank. However, due to the above structure, the solid raw materials injected from the injection container are flowed out from the opening and are delivered into the conduit from the first glass-melting tank after being melted in the melting-tank inner container. Thus, the enough remaining time for removing the bubbles from the molten glass in the first glass-melting tank, and therefore the inclusion of bubbles into glass fibers to be spun can be effectively reduced.

It is preferable that an upper partition plate for partitioning an upper portion of the molten glass be provided in the first glass-melting tank. Due to such a structure, the upper partition plate can prevent the bubbles removed from the molten glass from flowing along with the flow of the molten glass. Accordingly, the bubbles can be prevented from flowing into the conduit. Thus, the inclusion of bubbles into the glass fibers to be spun can be effectively reduced.

It is preferable that a lower partition plate for partitioning a lower portion of the molten glass be provided in the first glass-melting tank. Due to such a structure, the molten glass melted in the first glass-melting tank flows into the conduit after climbing over the lower partition plate. Accordingly, the sufficient remaining time for removing the bubbles from the molten glass can be ensured, while the bubbles removed from the molten glass can be prevented from flowing into the conduit with the fast flow on the bottom portion of the first glass-melting tank. Thus, the inclusion of bubbles into the glass fibers to be spun can be effectively reduced. Further, since the solid raw materials which are not completely melted are prevented from flowing by the lower partition plate, these solid raw materials can be prevented from flowing into the conduit.

It is preferable that at least one of the upper partition plate and the lower partition plate be provided in the first melting tank. It is more preferable that both of them be provided in the first melting tank.

Incidentally, the first sucking device may be the same as the second sucking device. Due to such a structure, the pressure in the first glass-melting tank can easily coincident with the pressure in the injection container. Further, since the pressures in both the first glass-melting tank and the injection container can be reduced by one sucking device, the cost can be reduced.

A method for producing glass fibers according to a further aspect of the present invention using the glass-melting device for producing glass fibers as described above includes: injecting solid raw materials into the injection container by opening the first opening-closing mechanism while the second opening-closing mechanism is closed; injecting the solid raw materials into the first glass-melting tank by opening the second opening-closing mechanism while the first opening-closing mechanism is closed to reduce a pressure in the injection container by the second sucking device; melting the solid raw materials by heating the first glass-melting tank under the reduced-pressure atmosphere; injecting the molten glass which is melted by heating the conduit, the second glass-melting tank, and the bushing into the second glass-melting tank; and spinning the molten glass from nozzles of the bushing for producing glass fibers.

In the method for producing glass fibers according to the further aspect of the present invention, bubbles can be removed from the molten glass by melting the solid raw materials in the first glass-melting tank under the reduced-pressure atmosphere. Therefore, the inclusion of bubbles into glass fibers to be spun can be effectively reduced. Then, by injecting the solid raw materials into the injection container while the second opening-closing mechanism is closed, reducing the pressure in the injection container while the first opening-closing mechanism and the second opening-closing mechanism are closed, and injecting the solid raw materials into the first glass-melting tank while only the second opening-closing mechanism is opened, the solid raw materials can be injected into the first glass-melting tank without exposing the first glass-melting tank to the atmospheric pressure. Therefore, the pressure variations in the first glass-melting tank can be suppressed. Thus, the variations in the liquid level of the molten glass in the first glass-melting tank can be suppressed, and therefore the generation of bubbles brought from the contact surface between the wall surface of the first glass-melting tank and the molten glass can be suppressed. Since the variations in the liquid level of the molten glass in the first glass-melting tank can be suppressed, the variations in the liquid level of the molten glass in the second glass-melting tank can be also suppressed. Accordingly, the generation of bubbles brought from the contact surface between the wall surface of the second glass-melting tank and the molten glass can be also suppressed. Thus, the variations in the diameter of the glass fiber to be spun can be suppressed, and variations in the strength or electric characteristics of a molded article due to count variations of the glass fiber can be suppressed.

Advantageous Effects of Invention

According to the present invention, a glass-melting device for producing glass fibers capable of effectively reducing the inclusion of bubbles in glass fibers to be spun, and a method for producing glass fibers using the same.

Also, breakage of a conduit and a decompression housing caused by heating of the conduit can be prevented according to the present invention.

Further, pressure fluctuations in the first glass-melting tank can be suppressed when solid raw materials are injected into the first glass-melting tank according to the present invention.

BRIEF DESCRIPTION OF DRAWINGS

FIG. 1 is a cross-sectional view showing a structure of a glass-melting device for producing glass fibers according to a first embodiment.

FIG. 2 is a perspective view schematically showing the structure of the glass-melting device for producing glass fibers from which a decompression housing is removed.

FIGS. 3a and 3b show how a conduit and the decompression housing are connected to each other in a lower portion of the conduit. FIG. 3a is a partially cutaway front view, and FIG. 3b is a cross-sectional view taken along the line b-b of FIG. 3a.

FIG. 4 is a cross-sectional view showing a structure of a glass-melting device for producing glass fibers according to a second embodiment.

FIGS. 5a and 5b show how a conduit and a decompression housing are connected to each other in a lower portion of the conduit. FIG. 5a is a partially cutaway front view, and FIG. 5b is a cross-sectional view taken along the line b-b of FIG. 5a.

FIG. 6 shows a temperature distribution of the conduit sandwiched between a pair of electrode parts.

FIG. 7 is a cross-sectional view showing a structure of a glass-melting device for producing glass fibers according to a third embodiment.

FIGS. 8a and 8b are cross-sectional views showing part of the glass-melting device for producing glass fibers shown in FIG. 7 in an enlarged manner. FIG. 8a is a cross-sectional front view, and FIG. 8b is a cross-sectional view taken along the line b-b of FIG. 8a.

[FIG. 9] FIGS. 9a and 9b show how a conduit and a decompression housing are connected to each other in a lower portion of the conduit. FIG. 9a is a partially cutaway front view, and FIG. 9b is a cross-sectional view taken along the line b-b of FIG. 9a.

FIG. 10 is a cross-sectional view showing a structure of a glass-melting device for producing glass fibers according to a fourth embodiment.

FIGS. 11a and 11b are cross-sectional views showing part of the glass-melting device for producing glass fibers shown in FIG. 10 in an enlarged manner. FIG. 11a is a cross-sectional front view, and FIG. 11b is a cross-sectional view taken along the line b-b of FIG. 11a.

FIG. 12 shows a conduit and a conduit housing which are thermally expanded.

FIGS. 13a to 13d show part of a conduit according to a fifth embodiment in an enlarged manner. FIGS. 13a to 13d show modifications of the conduit.

FIG. 14 is a cross-sectional view showing a structure of a glass-melting device for producing glass fibers according to a sixth embodiment.

FIG. 15 is a cross-sectional view showing a structure of a glass-melting device for producing glass fibers according to a modification.

FIG. 16 is a cross-sectional view showing a structure of a glass-melting device for producing glass fibers according to another modification.

FIG. 17 is a cross-sectional view showing a structure of a glass-melting device for producing glass fibers according to another modification.

FIG. 18 is a cross-sectional view showing a structure of a glass-melting device for producing glass fibers according to another modification.

FIG. 19 is a cross-sectional view showing a structure of a glass-melting device for producing glass fibers according to another modification.

[FIG. 20] FIGS. 20a and 20b are microscope photographs of a glass gob prepared by obtaining a molten glass under atmospheric pressure without vacuum defoaming, flowing the molten glass downward from a nozzle of a bushing due to hydrostatic pressure of the molten glass in a melting tank, and cooling and solidifying the molten glass (FIG. 20a), and of a glass gob prepared in the same manner except that a molten glass is obtained by vacuum defoaming the molten glass in the glass-melting device shown in FIG. 1 (FIG. 20b).

DESCRIPTION OF EMBODIMENTS

Figure 1:
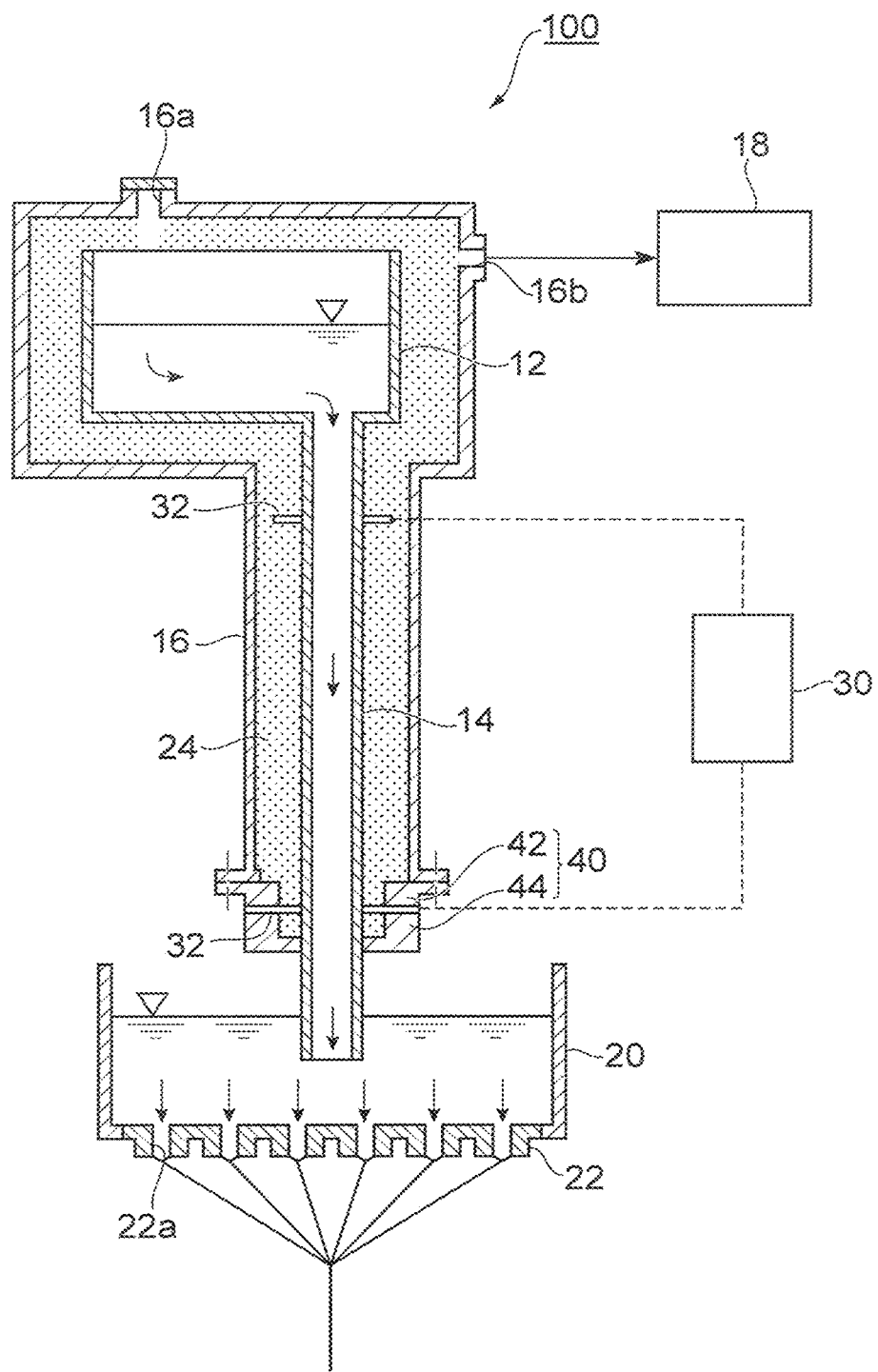
[FIG. 1]

Embodiments of the present invention will be explained in detail below with reference to the accompanying drawings. It should be noted that the same reference numerals will be assigned to the same or equivalent components and a description thereof will be omitted.

[First Embodiment]

Figure 2:
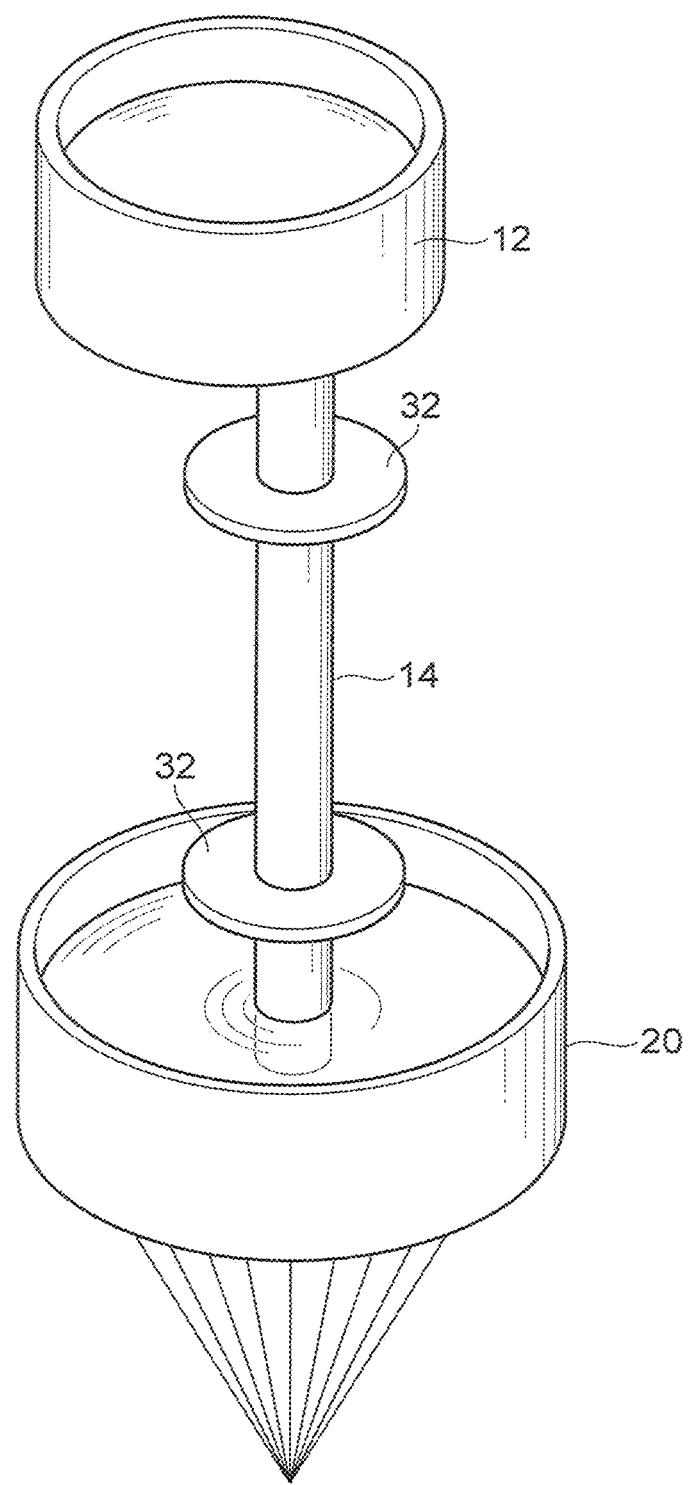
[FIG. 2]

FIG. 1 is a cross-sectional view showing a structure of a glass-melting device for producing glass fibers according to a first embodiment. FIG. 2 is a perspective view schematically showing the structure of the glass-melting device for producing glass fibers from which a decompression housing is removed. As shown in FIGS. 1 and 2, the glass-melting device 100 for producing glass fibers (hereinafter also simply referred to as a glass-melting device) according to the first embodiment includes a first glass-melting tank 12, a conduit 14, a decompression housing 16, a sucking device 18, a second glass-melting tank 20, and a bushing 22.

The first glass-melting tank 12 receives injected molten glass, glass gobs, or glass raw materials and melts them. An upper part of the first glass-melting tank 12 is opened.

The first glass-melting tank 12 includes heating means (not shown) for melting the molten glass, glass gobs, or glass raw materials. For example, the heating means may be a burner or an electric heater. Alternatively, a current may be applied from an electrode connected to the tank and the tank may be self-heated. For self-heating, it is preferable that at least an inner wall of the tank be made of a material which produces heat when a current is applied. For example, it is preferable that at least the inner wall be made of platinum or platinum-alloy.

The conduit 14 extends downward from the first glass-melting tank 12 for delivering glass which is melted in the first glass-melting tank 12 into the second glass-melting tank 20. The conduit 14 includes heating means 30 for heating the molten glass. The heating means 30 generates self-heating when a current is applied from flange-shaped electrode parts 32 provided on an upper portion and a lower portion of the conduit 14. Accordingly, the conduit 14 is made of a material producing heat when a current is applied. For example, it is made of platinum or platinum-alloy. Incidentally, the electrode part 32 may be provided on a wall surface of the first melting tank, instead of the upper portion of the conduit 14. At this time, it is preferable that the electrode part 32 be provided on a bottom surface or a lower portion of a side surface of the first melting tank so that the electrode part 32 does not obstruct the heating means of the first melting tank.

The decompression housing 16 hermetically covers the first glass-melting tank 12 and the conduit 14, while a lower end of the conduit 14 projects. The material and structure of the decompression housing 16 are not particularly limited as long as it has airtightness and strength. It is preferable that the decompression housing 16 be made of a metal material such as stainless steel.

An introduction opening 16a for introducing molten glass, glass gobs, or glass raw materials is provided on the upper wall of the decompression housing 16. The introduction opening 16a is openable and closable. A suction opening 16b connected to the sucking device 18 for decompression is provided on the side wall of the decompression housing 16. It is preferable that a heat insulating material 24 be provided in a space between the decompression housing 16 and the first glass-melting tank 12 and the conduit 14 for improving heat-insulating efficiency.

The sucking device 18 sucks gas in the decompression housing 16 by a vacuum pump to provide reduced-pressure atmosphere in the decompression housing 16.

The second glass-melting tank 20 is provided below the conduit 14 for receiving the molten glass supplied from the conduit 14 and melting them. The upper side of the second glass-melting tank 20 is opened and is exposed to atmospheric-pressure atmosphere. The second glass-melting tank 20 includes heating means (not shown) for heating the molten glass. For example, the heating means may be a burner or an electric heater. Alternatively, a current may be applied from an electrode connected to the tank and the tank may be self-heated. For self-heating, it is preferable that at least an inner wall of the tank be made of a material which produces heat when a current is applied. For example, it is preferable that at least the inner wall be made of platinum or platinum-alloy.

The bushing 22 is provided at the bottom of the second glass-melting tank 20. The bushing 22 has a large number of (for example, approximately 100 to 4000) nozzles 22a for spinning. The bushing 22 also has heating means for heating the molten glass. The heating means generates self-heating when a current is applied from an electrode (not shown) provided on the bushing 22. Accordingly, the bushing 22 is made of a material producing heat when a current is applied. For example, the bushing 22 is made of platinum or platinum-alloy.

The heating means for heating the first glass-melting tank 12, the conduit 14, the second glass-melting tank 20, and the bushing 22 can adjust their temperatures separately.

Figure 3:
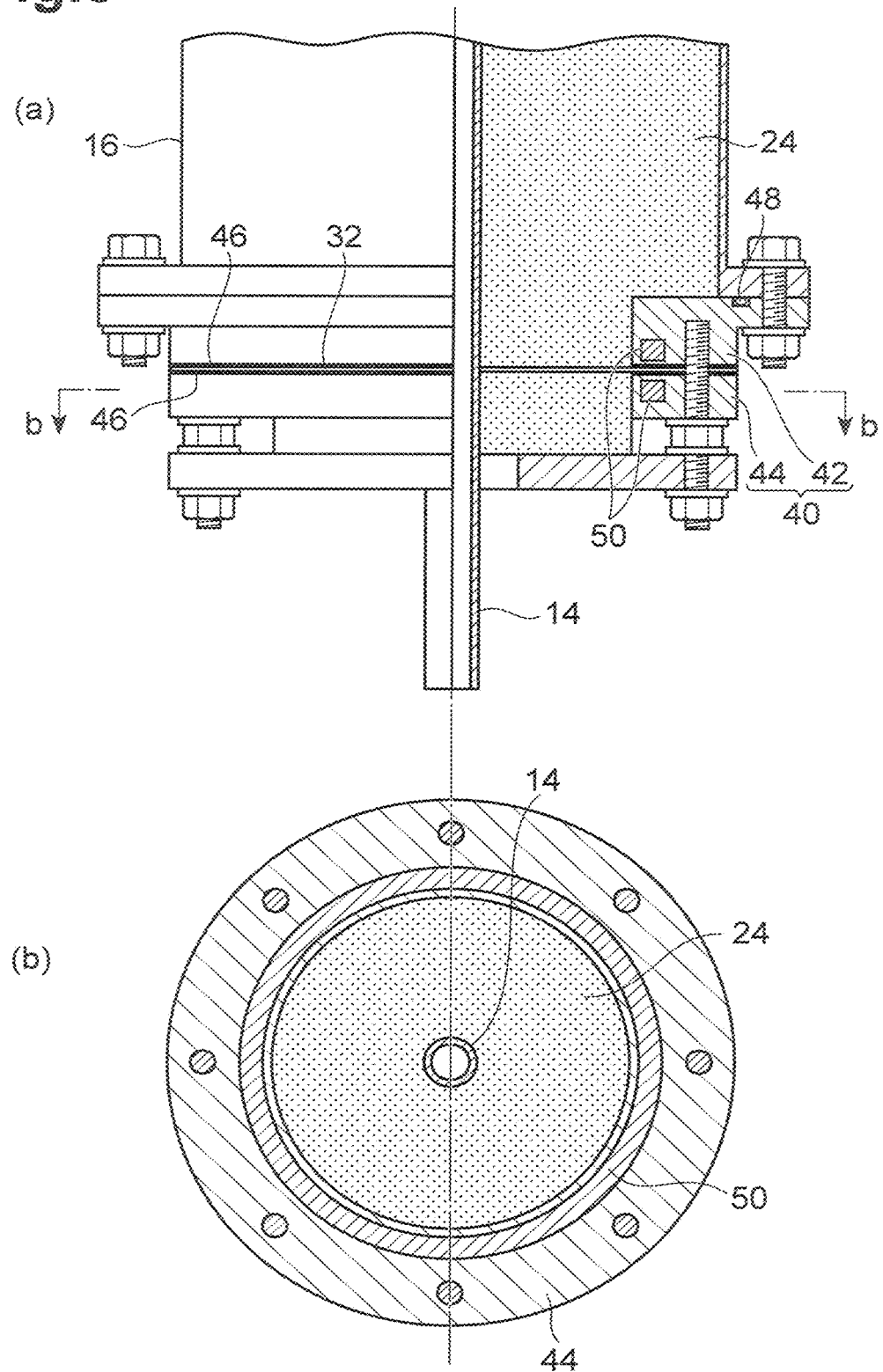
[FIG. 3]

Since the decompression housing 16 covers the conduit 14 as described above, it is important how the lower portion of the conduit 14 and the decompression housing 16 are connected to each other. In this embodiment, the lower portion of the conduit 14 and the decompression housing 16 are connected by a flange 40 having water-cooled tubes 50 as shown in FIG. 3. FIGS. 3a and 3b show how the conduit and the decompression housing are connected to each other in the lower portion of the conduit. FIG. 3a is a partially cutaway front view, and FIG. 3b is a cross-sectional view taken along the line b-b of FIG. 3a.

More specifically, the flange 40 has an upper flange 42 and a lower flange 44 which sandwich the flange-shaped electrode part 32 integrated with the lower portion of the conduit 14. The upper flange 42 is connected to a lower end of the decompression housing 16 via a bolt or the like for sandwiching the electrode part 32 from the upper side. The lower flange 44 is inserted from a lower end of the conduit 14 for sandwiching the electrode part 32 from the lower side. The upper flange 42 and the lower flange 44 are circular members and made of metal such as stainless steel. The heat insulating material 24 is provided on their inner sides.

The upper flange 42 and the lower flange 44 are integrally connected to each other via a bolt or the like while sandwiching the electrode part 32 from the upper and lower sides. A packing 46 is provided between the upper flange 42 and the electrode part 32 and between the lower flange 44 and the electrode part 32 for ensuring airtightness and electrical insulation. Further, an O-ring 48 is provided between the decompression housing 16 and the upper flange 42 for ensuring airtightness. Thus, the airtightness between the lower portion of the conduit 14 and the decompression housing 16 can be maintained by the electrode part 32 hermetically sandwiched by the upper flange 42 and the lower flange 44.

The electrode part 32 is heated when a current is directly applied, and therefore the temperature of the electrode part 32 itself becomes high. Accordingly, the temperature of the connection portion may become 300 degrees C. or more, which is more than heatproof temperatures of the O-ring 48 and the packing 46. Therefore, the airtightness may not be maintained. Thus, the water-cooled tubes 50 are provided on the upper flange 42 and the lower flange 44 as shown in FIG. 3. In this embodiment, the water-cooled tubes 50 are formed by boring the upper flange 42 and the lower flange 44.

By cooling water, the conduit 14 is cooled and then the temperature of the molten glass flowing in the conduit 14 is reduced. Thus, the water-cooled tubes 50 are preferably provided as far away from the conduit 14 as possible. However, the decompression housing 16 is enlarged by positioning the water-cooled tubes 50 far away from the conduit 14. Therefore, it is preferable that the water-cooled tubes 50 be separated from the conduit 14 by approximately 90 mm to 200 mm. It is desirable that the cross-sectional shape of the water-cooled tube 50 be circular. However, it may be rectangular in light of processability.

It is also desirable that the water-cooled tubes 50 be arranged circularly for uniformly cooling the O-ring 48 and the packing 46. Further, by providing the water-cooled tubes 50 immediately below and immediately above the packing 46, the cooling can be performed efficiently.

It is preferable that at least the inner surfaces of the first glass-melting tank 12, the conduit 14, and the second glass-melting tank 20 be made of platinum or platinum-alloy. As described above, the first glass-melting tank 12, the conduit 14, and the second glass-melting tank 20 may be made of platinum or platinum-alloy in light of electrical heating. In addition, for preventing inclusion of foreign matters, at least the inner surfaces of them are made of platinum or platinum-alloy. Thus, the inclusion of foreign matters due to interface degradation of the molten glass caused when they are made of a refractory brick can be minimally suppressed.

Next, a method for producing glass fibers using the glass-melting device 100 for producing glass fibers as described above will be explained below.

First, molten glass, glass gobs, or glass raw materials are injected into the first glass-melting tank 12. The glass raw materials are powdered mixture of clay, limestone, dolomite, colemanite, silica sand, alumina, calcium carbonate, sodium carbonate, and the like. The molten glass is prepared by melting this mixture in advance prior to injection into the first melting tank. The glass gobs are prepared by cooling and solidifying the molten glass.

On the other hand, the pressure in the decompression housing 16 is reduced by the sucking device 18 such that the pressure in the decompression housing 16 is reduced by 0.4 to 0.9 atmosphere relative to atmospheric pressure. Also, the first glass-melting tank 12 is heated such that the temperature of the molten glass becomes 1350 to 1550 degrees C. to melt the molten glass, glass gobs, or glass raw materials.

The conduit 14, the second glass-melting tank 20, and the bushing 22 are also heated separately. The temperature of the conduit 14 is 1300 to 1450 degrees C., the temperature of the second glass-melting tank 20 is 1290 to 1400 degrees C., and the temperature of the bushing 22 is 1250 to 1300 degrees C. It is preferable that the temperatures be controlled such that the temperature of the molten glass in the conduit 14, the second glass-melting tank 20, and the bushing 22 is higher than the temperature of the molten glass in the first glass-melting tank 12. Thus, the generation of bubbles due to reboiling can be suppressed. Next, the molten glass is introduced into the second glass-melting tank 20 from the first glass-melting tank 12 through the conduit 14. Then, the molten glass is wound around a winding machine (not shown) from the nozzles 22a of the bushing 22 under high tension, so that the molten glass is spun and fiberized. For example, a discharge amount of the molten glass from one nozzle 22a is 0.05 to 5.0 g/minute.

Since the molten glass in the first glass-melting tank 12 is exposed in the reduced-pressure atmosphere as described above, bubbles can be effectively removed from the glass. Further, since not only the first glass-melting tank 12, the second glass-melting tank 20, and the bushing 22 but also the conduit 14 are heated, and the temperatures of them are separately controlled, the glass is prevented from being solidified in the conduit 14. In producing glass fibers, the molten glass may be cooled and solidified in the middle of the conduit 14 because the weight of spun glass per unit time is small and the brought-in heat is also small. However, in this embodiment, the glass is prevented from being solidified in the conduit 14 due to the above-described structure.

In this embodiment, the spinning is conducted under the condition that a liquid level of the molten glass in the first glass-melting tank 12 is higher than a liquid level of the molten glass in the second glass-melting tank 20 by 150 cm or more. More preferably, it is higher by 230 to 460 cm. Due to such height, the liquid level of the molten glass in the first glass-melting tank 12 can be reduced by approximately 0.4 to 0.9 atmosphere relative to atmospheric pressure, and gas in the molten glass is continuously dispersed in existing bubbles and a bubble diameter is rapidly increased. Thus, a large defoaming effect can be obtained.

A suction amount of the sucking device 18 is controlled such that the reduced-pressure atmosphere in which the first glass-melting tank 12 is exposed, i.e., the difference between the pressure in the decompression housing 16 and the atmospheric pressure, is constant. Thus, fluctuations in the liquid level of the molten glass due to tiny fluctuations of the atmospheric pressure can be suppressed.

The injection amount of the molten glass, glass gobs, or glass raw materials into the first glass-melting tank 12 is controlled based on the height of the liquid level of the molten glass in the second glass-melting tank 20 such that the height is constant. The area of the liquid level of the molten glass in the second glass-melting tank 20 is larger than the area of the liquid level of the molten glass in the first glass-melting tank 12. Thus, fluctuations in the liquid level in the second glass-melting tank 20 can be reduced, and the generation of bubbles brought from the contact surface between the wall surface of the second glass-melting tank 20 and the molten glass can be suppressed. Further, variations in the diameter of the glass fiber to be spun can be suppressed, and variations in the strength or electric characteristics of a molded article due to count variations of the glass fiber can be suppressed.

As described above, in the glass-melting device 100 according to this embodiment, bubbles can be removed from the molten glass by melting the glass in the first glass-melting tank 12 under the reduced-pressure atmosphere. Thus, the inclusion of bubbles into glass fibers to be spun can be effectively reduced without using clarifying agent. For example, as compared to glass fibers which are spun under atmospheric-pressure atmosphere without defoaming molten glass under reduced-pressure atmosphere, the number of bubbles in glass fibers having the same length can be reduced to be 1/10 to 1/1000.

Since the first glass-melting tank 12, the conduit 14, the second glass-melting tank 20, and the bushing 22 are respectively have the heating means for adjusting their temperatures separately, the temperatures of the first glass-melting tank 12, the conduit 14, the second glass-melting tank 20, and the bushing 22 are adjusted separately. Thus, the most appropriate temperature condition can be provided in each region, and the reboiling can be easily controlled for suppressing the generation of bubbles.

Since the electrode parts 32 are provided on the upper portion and the lower portion of the conduit 14 and heated when a current is applied, the molten glass can be prevented from being cooled and solidified in the conduit 14.

Since the first glass-melting tank 12 and the conduit 14 are covered by the decompression housing 16 in which the pressure is reduced by the sucking device 18, the pressure in the first glass-melting tank 12 can be easily controlled to be reduced. Also, since the buckling of the conduit 14 due to decompression is not easily occurred by covering the conduit 14 with the decompression housing 16, the conduit 14 can be thinned. Particularly, it is effective when the conduit 14 is made of an expensive material such as platinum.

Since the lower portion of the conduit 14 and the decompression housing 16 are connected by the flange 40 having the water-cooled tubes 50, the conduit 14 and the decompression housing 16 are hermetically sealed by using the packing 46 and the O-ring 48.

[Second Embodiment]

Next, a second embodiment of the present invention will be explained below with reference to FIGS. 4 and 5. A glass-melting device 200 for producing glass fibers according to the second embodiment has basically the same structure as the glass-melting device 100 for producing glass fibers according to the first embodiment. Thus, only the differences between the first embodiment and the second embodiment will be explained and an explanation of the similarities will be omitted.

Figure 4:
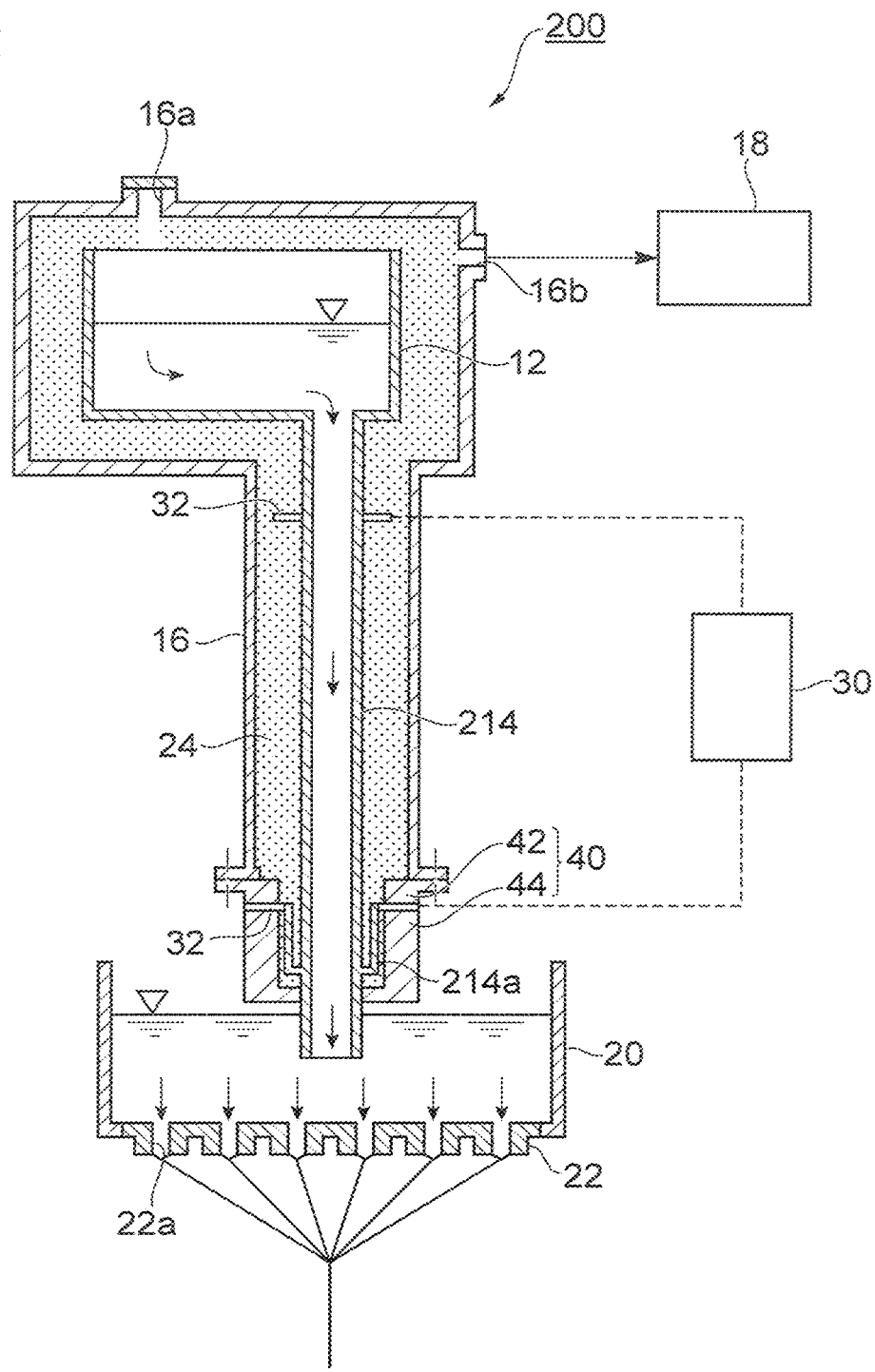
[FIG. 4]
Figure 5:
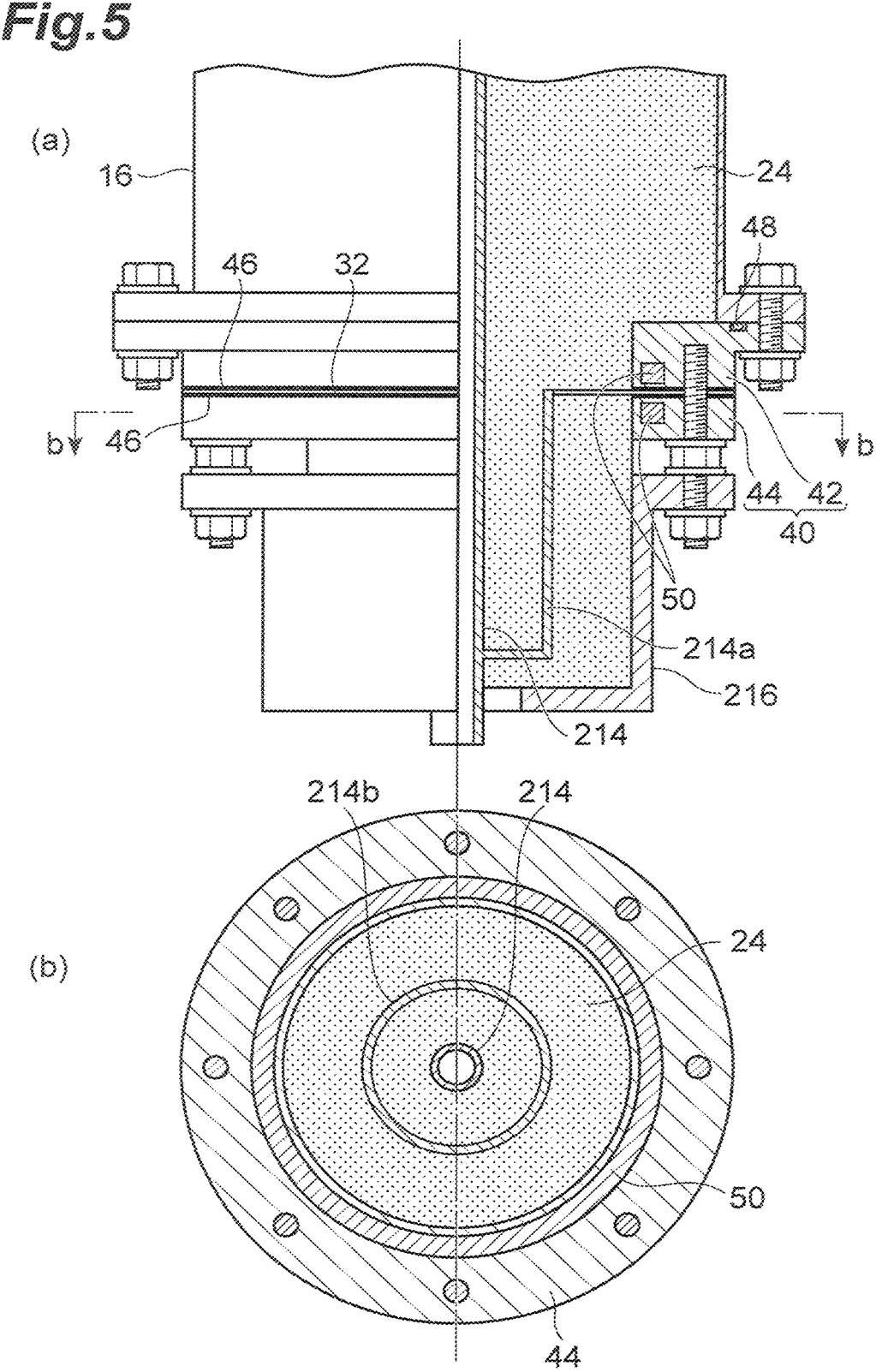
[FIG. 5]

FIG. 4 is a cross-sectional view showing the structure of the glass-melting device for producing glass fibers according to the second embodiment. FIGS. 5a and 5b show how a conduit and a decompression housing are connected to each other in the lower portion of the conduit. FIG. 5a is a partially cutaway front view, and FIG. 5b is a cross-sectional view taken along the line b-b of FIG. 5a. As shown in FIGS. 4 and 5, the glass-melting device 200 for producing glass fibers includes the first glass-melting tank 12, a conduit 214, the decompression housing 16, the sucking device 18, the second glass-melting tank 20, and the bushing 22.

The conduit 214 extends downward from the first glass-melting tank 12 for delivering glass which is melted in the first glass-melting tank 12 into the second glass-melting tank 20 in the same manner as the first embodiment. A conduit branch part 214a branched from the conduit 214 is formed on a lower end portion of the conduit 214.

The conduit branch part 214a is folded to cover the conduit 214 from the lower end portion of the conduit 214 in the vicinity of the lower end portion of the decompression housing 16. The conduit branch part 214a is spaced away from the conduit 214 by a predetermined distance and is formed in a cylindrical shape extending upwardly along the conduit 214 in the vertical direction. Accordingly, double tubes are formed by the conduit 214 and the conduit branch part 214a. An end of the conduit branch part 214a is connected to the electrode part 32 sandwiched by the upper flange 42 and the lower flange 44 between the conduit 214 and the water-cooled tubes 50. Therefore, the electrode part 32 and the conduit 214 are apart from each other by a predetermined distance. Thus, the airtightness between the lower portion of the conduit 214 and the decompression housing 16 can be maintained by the conduit branch part 214a and the electrode part 32 hermetically sandwiched by the upper flange 44 and the lower flange 42. By suction using the sucking device 18, the reduced-pressure atmosphere is provided between the conduit 214 and the conduit branch part 214a. Similarly to the conduit 214, the conduit branch part 214a is made of a material producing heat when a current is applied. For example, the conduit branch part 214a is made of platinum or platinum-alloy. Therefore, a current is applied to the conduit 214 from the electrode part 32 via the conduit branch part 214a.

The heat insulating material 24 accommodated between the decompression housing 16 and the conduit 214 is also accommodated between the conduit 214 and the conduit branch part 214a. Accordingly, the heat insulating material 24 is arranged in the space formed between the electrode part 32 and the conduit 214. Thus, a cooling effect on the conduit 214 due to the water-cooled tubes 50 provided on the upper flange 42 and the lower flange 44 can be reduced.

The lower flange 44 is connected to a housing 216 covering the conduit branch part 214a, and the heat insulating material 24 is accommodated between the housing 216 and the conduit branch part 214a. Thus, the heating efficiency in the conduit branch part 214a can be improved. A region between the conduit branch part 214a and the housing 216 is separated from a region between the conduit branch part 214a and the conduit 214 because of the existence of the conduit branch part 214a. Thus, even when the sucking device 18 sucks the pressure, reduced-pressure atmosphere is not provided in the region between the conduit branch part 214a and the housing 216.

Figure 6:
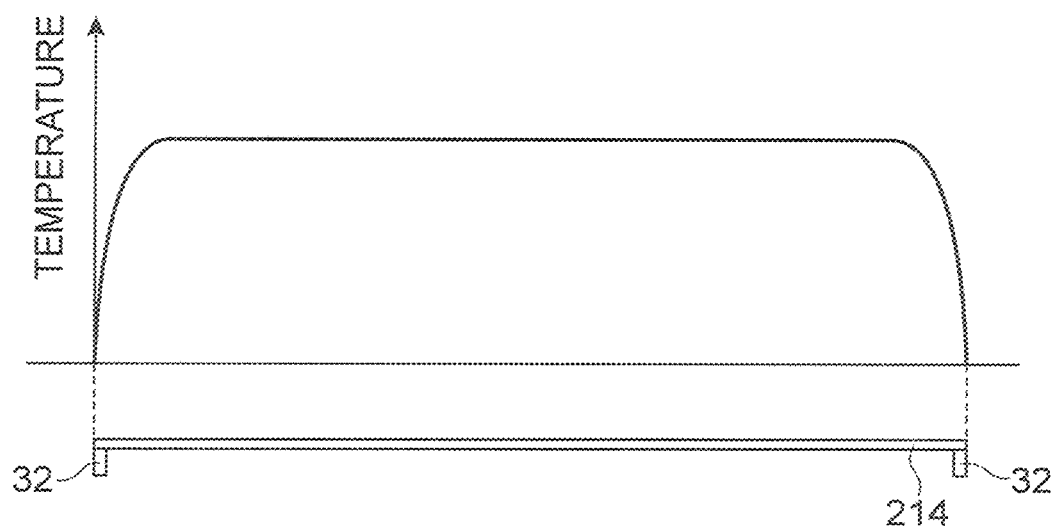
[FIG. 6]

FIG. 6 shows a temperature distribution of the conduit sandwiched between a pair of electrode parts. In FIG. 6, the conduit 214 extends straight for the sake of simplicity. As shown in FIG. 6, when a current is applied from the pair of electrode parts 32, a temperature gradient of the central part of the conduit 214 is small and the temperature thereof is raised to a set temperature while temperature gradients in the vicinity of connection parts of the conduit 214 connected to the electrode parts 32 are large and the temperature thereof is gradually decreased toward ends of the conduit 214. In the vicinity of the connection part connected to the electrode part 32 positioned close to the first glass-melting tank 12, the conduit 214 can be prevented from being excessively cooled by the brought-in heat of the molten glass introduced from the first glass-melting tank 12. However, in the vicinity of the connection part connected to the electrode part 32 positioned close to the second glass-melting tank 20, the temperature may be decreased to be less than the set temperature and the conduit 214 may be excessively cooled because the brought-in heat is small. Therefore, the electrode part 32 is connected to the end of the conduit branch part 214a branched from the lower end portion of the conduit 214, so that the connection part connected to the electrode part 32 and the conduit 214 are spaced apart from each other by a predetermined distance. Accordingly, the temperature of the lower end portion of the conduit 214 can be stably raised to the set temperature. Thus, the temperature of the molten glass introduced into the conduit 214 can be appropriately raised. Incidentally, for ensuring a region for heating the molten glass in the conduit 214, it is preferable that the position where the conduit branch part 214a is branched from the conduit 214 be as low as possible.

[Third Embodiment]

Next, a third embodiment of the present invention will be explained below with reference to FIGS. 7 and 8. A glass-melting device 300 for producing glass fibers according to the third embodiment has basically the same structure as the glass-melting device 100 for producing glass fibers according to the first embodiment. Thus, only the differences between the first embodiment and the third embodiment will be explained below and an explanation of the similarities will be omitted.

Figure 7:
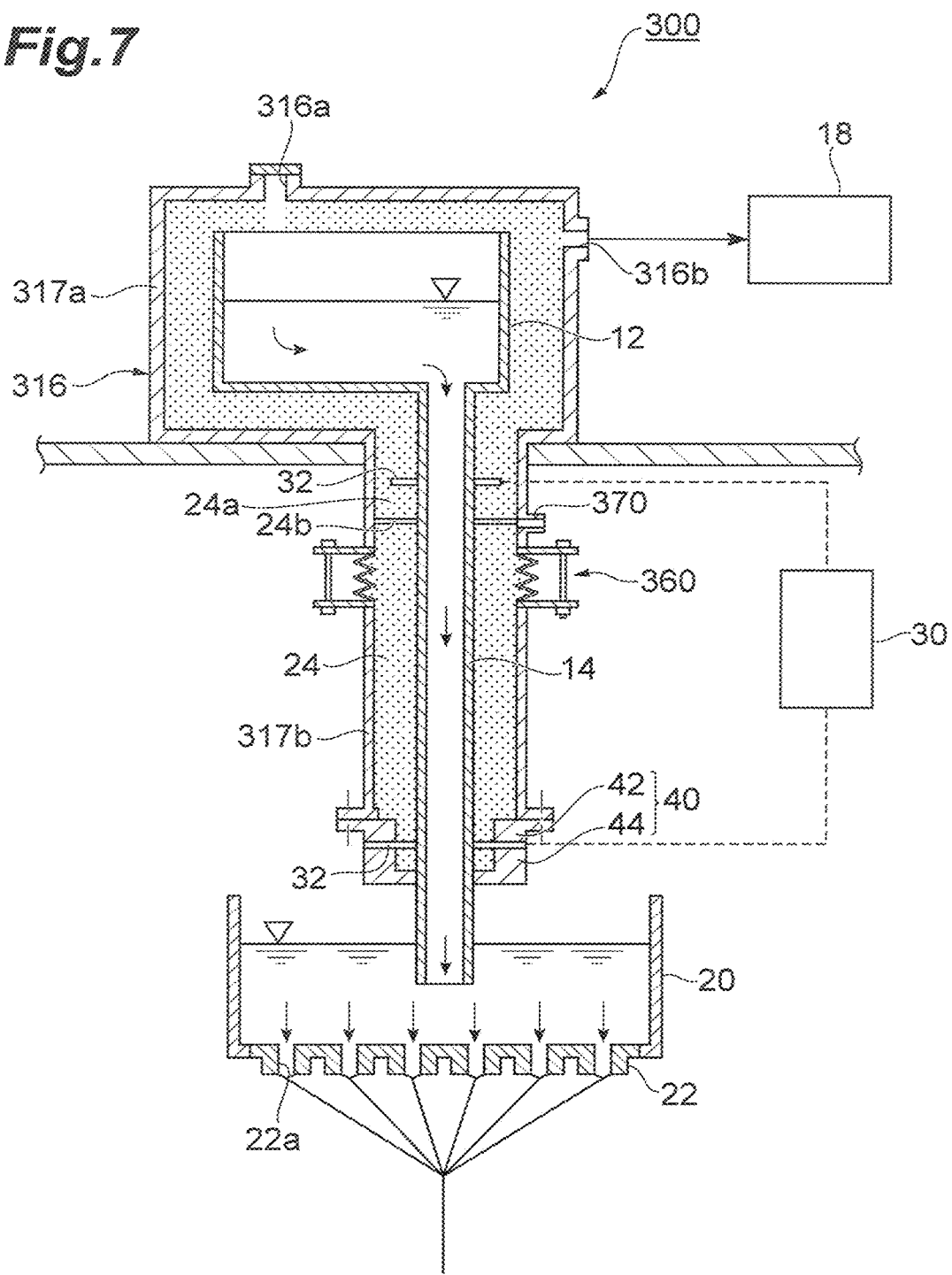
[FIG. 7]
Figure 8:
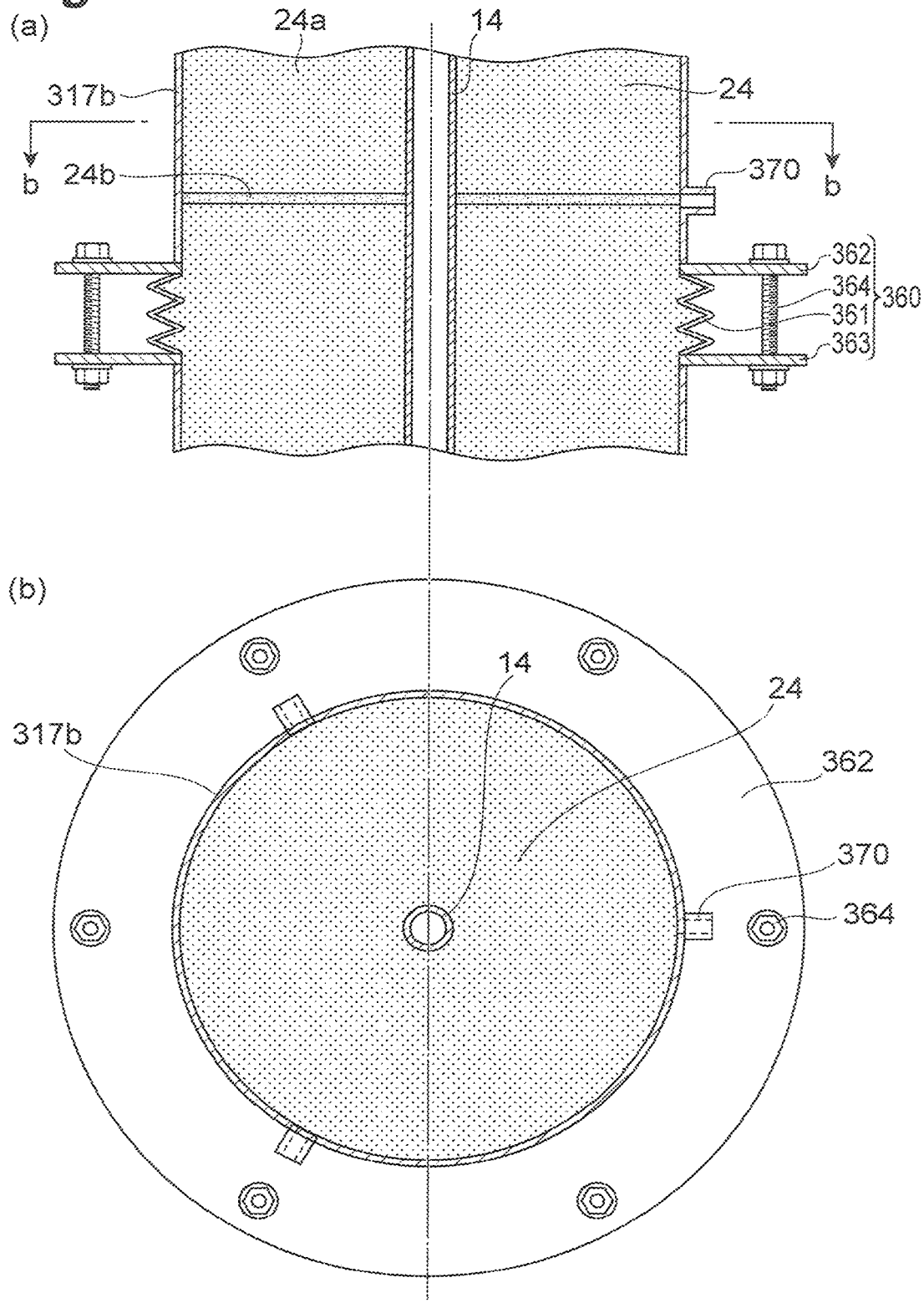
[FIG. 8]

FIG. 7 is a cross-sectional view showing the structure of the glass-melting device for producing glass fibers according to the third embodiment. FIGS. 8a and 8b are cross-sectional views showing part of the glass-melting device for producing glass fibers shown in FIG. 7 in an enlarged manner. FIG. 8a is a cross-sectional front view, and FIG. 8b is a cross-sectional view taken along the line b-b of FIG. 8a. As shown in FIGS. 7 and 8, the glass-melting device 300 for producing glass fibers includes the first glass-melting tank 12, the conduit 14, a decompression housing 316, the sucking device 18, the second glass-melting tank 20, and the bushing 22.

The decompression housing 316 is formed by a melting-tank housing 317a covering the first glass-melting tank 12 and a conduit housing 317b covering the conduit 14. The decompression housing 316 hermetically covers the first glass-melting tank 12 and the conduit 14 while a lower end of the conduit 14 projects. The material and structure of the decompression housing 316 are not particularly limited as long as it has airtightness and strength. It is preferable that the decompression housing 316 be made of a metal material such as stainless steel.

The heat insulating material 24 is accommodated in the space between the decompression housing 316, and the first glass-melting tank 12 and the conduit 14 for improving the heat-insulating efficiency. The heat insulating material 24 insulates the first glass-melting tank 12 and the conduit 14, and the decompression housing 316, and allows the temperature of the decompression housing 316 to be a heatproof temperature or less. Thus, the heat insulating material 24 is made of a material which allows the temperature of the decompression housing 316 to be the heatproof temperature or less and maintains the structure for a long period of time. For example, the heat insulating material 24 may be made of an insulating firebrick 24a having excellent shape-retainable property and economic efficiency or an elastic heat insulating material 24b having an elastic structure. The elastic heat insulating material 24b may be a wool heat insulating material such as a fiber flux which is made of glass wool.

When the conduit 14 is heated by the heating means 30 as described above, the conduit 14 and the conduit housing 317b are elongated by thermal expansion. Accordingly, in this embodiment, the heat insulating material 24 accommodated in the melting-tank housing 317a is formed of the laminated insulating firebricks 24a, and the heat insulating material 24 accommodated in the conduit housing 317b is formed by inserting the elastic heat insulating material 24b between the laminated insulating firebricks 24a. The elastic heat insulating material 24b is expanded by the elongation of the conduit 14 and the conduit housing 317b, so that the conduit housing 317b is constantly filled with the heat insulating material 24. Incidentally, the elastic heat insulating material 24b may be inserted between the insulating firebricks 24a at any appropriate position. However, in light of the weight of the insulating firebricks 24a, it is preferable that the elastic heat insulating material 24b be inserted between the insulating firebricks 24a arranged on the upper portion.

The melting-tank housing 317a is provided in a construction for installing the glass-melting device 300. For example, the melting-tank housing 317a may be mounted on a floor surface of the construction. Therefore, the heat insulating material 24 accommodated in the melting-tank housing 317a is supported by the floor surface of the construction.

An introduction opening 316a for injecting molten glass, glass gobs, or glass raw materials is provided on an upper wall of the melting-tank housing 317a. The introduction opening 316a is openable and closable. A suction opening 316b connected to the sucking device 18 for decompression is provided on a side wall of the melting-tank housing 317a.

When the conduit 14 is heated by the heating means 30 as described above, the temperature of the conduit 14 is raised to approximately 1400 degrees C. However, the temperature of the conduit housing 317b is raised only to approximately 300 degrees C. because the conduit housing 317b is insulated by the heat insulating material 24 and is exposed to outer air. Due to the difference in the temperature and the coefficient of thermal expansion between the conduit 14 and the conduit housing 317b, the thermal expansion amount of the conduit 14 and the thermal expansion amount of the conduit housing 317b are different from each other and therefore their lengths are different from each other. Thus, in this embodiment, an extendable housing part 360 which is extendable and retractable in the longitudinal direction (vertical direction) is provided on part of a body portion of the conduit housing 317b as shown in FIG. 8.

The extendable housing part 360 extends or retracts the conduit housing 317b in the longitudinal direction. The extendable housing part 360 suppresses adverse affect due to radiation heat of the second glass-melting tank 20. The extendable housing part 360 is provided on an upper portion of the center of the conduit housing 317b in the longitudinal direction in light of long-term durability and workability. The extendable housing part 360 includes a bellows portion 361, a first flange portion 362, a second flange portion 363, and a support portion 364.

The bellows portion 361 bends into concertinas to be extendable and retractable. The bellows portion 361 has the same cross-section as the conduit housing 317b and forms the body portion of the conduit housing 317b. The material and structure of the bellows portion 361 are not particularly limited as long as it has airtightness and strength. It is preferable that the bellows portion 361 be made of a metal material such as stainless steel.

The first flange portion 362 is formed on a flange projecting from the conduit housing 317b on the upper portion of the bellows portion 361. The second flange portion 363 is formed on a flange projecting from the conduit housing 317b on the lower portion of the bellows portion 361. The first flange portion 362 and the second flange portion 363 are arranged opposite to each other to sandwich the bellows portion 361.

The support portion 364 supports the first flange portion 362 and the second flange portion 363 to be extendable and retractable. Accordingly, the support portion 364 has load bearing enough to support the conduit 14, the conduit housing 317b, and the heat insulating material 24 accommodated in the conduit housing 317b, and has an extendable and retractable structure. More specifically, the support portion 364 is formed by a plurality of bolts and nuts screwed to the first flange portion 362 and the second flange portion 363. For example, by loosening the bolts, the first flange portion 362 and the second flange portion 363 are spaced further away from each other and then the extendable housing part 360 is extended. By fastening the bolts, the first flange portion 362 and the second flange portion 363 become closer to each other and then the extendable housing part 360 is retracted.

A heat insulating material insertion opening 370 to which the heat insulating material 24 is inserted is provided on the side wall of the conduit housing 317b. The heat insulating material insertion opening 370 is provided on the upper portion of the conduit housing 317b in view of workability when the heat insulating material 24 is inserted. More specifically, the heat insulating material insertion opening 370 is arranged at the position where the elastic heat insulating material 24b is inserted between the laminated insulating firebricks 24a.

As shown in FIG. 9, the conduit housing 317b is connected to the lower portion of the conduit 14 via the flange 40 having the water-cooled tubes 50.

Next, a method for producing glass fibers using the glass-melting device 300 as described above will be explained below.

When the glass-melting device 300 is started, a glass fiber production starting step of preparing for producing glass fibers is performed prior to a glass fiber production step of producing glass fibers.

In the glass fiber production starting step, molten glass, glass gobs, or glass raw materials are injected into the first glass-melting tank 12 and the second glass-melting tank 20. The glass raw materials are powdery mixture of clay, limestone, dolomite, colemanite, silica sand, alumina, calcium carbonate, sodium carbonate, and the like. The molten glass is prepared by melting the mixture prior to injection into the first glass-melting tank 12. The glass gobs are prepared by cooling and solidifying the molten glass.

Subsequently, the first glass-melting tank 12 and the second glass-melting tank 20 are heated to melt the injected molten glass, glass gobs, or glass raw materials. At this time, the conduit 14 is also heated. The molten glass, glass gobs, or glass raw materials injected into the first glass-melting tank 12 and the second glass-melting tank 20 are melted, and the lower end portion of the conduit 14 is closed by the molten glass. Then, the pressure in the decompression housing 316 is reduced by the sucking device 18 such that the pressure in the decompression housing 316 is reduced by 0.4 to 0.9 atmosphere relative to atmospheric pressure. By reducing the pressure in the decompression housing 316, the liquid level of the molten glass in the conduit 14 is increased.

Further, the first glass-melting tank 12, the conduit 14, the second glass-melting tank 20, and the bushing 22 are heated separately. The temperature of the first glass-melting tank 12 is 1350 to 1550 degrees C., the temperature of the conduit 14 is 1300 to 1450 degrees C., the temperature of the second glass-melting tank 20 is 1290 to 1400 degrees C., and the temperature of the bushing 22 is 1250 to 1300 degrees C. Then, the molten glass is introduced into the second glass-melting tank 20 from the first glass-melting tank 12 through the conduit 14, and is taken out from the nozzles 22a of the bushing 22. Incidentally, in the glass fiber production starting step, it is not required that the molten glass is taken out from the nozzles 22a of the bushing 22. The molten glass may be simply discharged from the nozzles 22a.

The temperature of the conduit 14 and the temperature of the conduit housing 317b are measured, and the extended amounts of the conduit 14 and the conduit housing 317b due to thermal expansion are calculated based on these temperatures. Then, a difference between the extended amount of the conduit 14 and the extended amount of the conduit housing 317b is calculated.

The difference λ, between the extended amount of the conduit 14 and the extended amount of the conduit housing 317b is obtained by the following equation (1).

$$\lambda = L(\alpha_1 \Delta t_1 - \alpha_2 \Delta t_2) \quad (1)$$

In the equation, L denotes the length of the conduit 14 and the conduit housing 317b before their temperatures are raised, $\alpha_1$ denotes a coefficient of thermal expansion of the conduit 14 after its temperature is raised, $\Delta t_1$ denotes a difference between an ambient temperature before the temperature is raised and a temperature of the conduit 14 after the temperature is raised, $\alpha_2$ denotes a coefficient of thermal expansion of the conduit housing 317b after its temperature is raised, and $\Delta t_2$ denotes a difference between an ambient temperature before the temperature is raised and a temperature of the conduit housing 317b after the temperature is raised.

For example, the length of the conduit 14 and the conduit housing 317b is 350 cm, and the conduit 14 is made of platinum. In the glass-melting device 300 including the conduit housing 317b made of stainless steel, the temperature of the conduit 14 is raised to 1400 degrees C. when the ambient temperature of atmosphere outside is 20 degrees C. and then the temperature of the conduit housing 317b is raised to 300 degrees C. At this time, the coefficient of thermal expansion of the conduit 14 is $1.0 \times 10^{-5}$ (/degrees C.) and the coefficient of thermal expansion of the conduit housing 317b is $1.7 \times 10^{-5}$ (/degrees C.). Thus, the conduit 14 is extended by approximately 4.83 cm, the conduit housing 317b is extended by approximately 1.67 cm, and the conduit 14 is extended longer than the conduit housing 317b by approximately 3.2 cm.

Then, the conduit housing 317b is extended by loosing the bolts of the extendable housing part 360 such that the difference between the extended amounts due to thermal expansion calculated as described above is zero. Accordingly, the length of the conduit 14 becomes equivalent to the length of the conduit housing 317b. When the heating of the conduit 14 is stopped to stop the glass-melting device 300, the bolts of the extendable housing part 360 are fastened and the conduit housing 317b is retracted. Accordingly, the length of the conduit 14 becomes equivalent to the length of the conduit housing 317b.

Incidentally, the insulating firebricks 24a laminated in the conduit housing 317b as the heat insulating material 24 have extremely small flexibility. Accordingly, when the conduit 14 and the conduit housing 317b are extended by thermal expansion and the conduit housing 317b is further extended by the adjustment of the extendable housing part 360, a gap is generated between the insulating firebricks 24a. Since the elastic heat insulating material 24b inserted between the insulating firebricks 24a is expanded, the gap between the insulating firebricks 24a is buried by the elastic heat insulating material 24b. When the extended amounts of the conduit 14 and the conduit housing 317b are large and the gap between the insulating firebricks 24a cannot be completely buried only by the expansion of the elastic heat insulating material 24b, or when the bulk density of the elastic heat insulating material 24b becomes small, the gap between the insulating firebricks 24a can be completely buried by newly inserting another heat insulating material 24 such as the elastic heat insulating material 24b into the conduit housing 317b.

When the glass-melting device 300 has a predetermined temperature and pressure, the glass fiber production starting step is terminated and the glass fiber production step is performed.

In the glass fiber production step, molten glass, glass gobs, or glass raw materials are injected into the first glass-melting tank 12 such that the liquid level in the first glass-melting tank 20 is approximately constant.

The pressure in the decompression housing 316 is reduced by the sucking device 18 such that the pressure in the decompression housing 316 is reduced by 0.4 to 0.9 atmospheres relative to atmospheric pressure. Also, the first glass-melting tank 12 is heated such that the temperature of the molten glass becomes 1350 to 1550 degrees C. to melt the molten glass, glass gobs, or glass raw materials.

Further, the conduit 14, the second glass-melting tank 20, and the bushing 22 are heated separately. The temperature of the conduit 14 is 1300 to 1450 degrees C., the temperature of the second glass-melting tank 20 is 1290 to 1400 degrees C., and the temperature of the bushing 22 is 1250 to 1300 degrees C. It is preferable that the temperatures be controlled such that the temperature of the molten glass in the first glass-melting tank 12 is higher than the temperature of the molten glass in the conduit 14, the second glass-melting tank 20, and the bushing 22. Thus, the generation of bubbles due to reboiling can be suppressed.

Then, the molten glass is introduced into the second glass-melting tank 20 from the first glass-melting tank 12 through the conduit 14. Subsequently, the molten glass is wound around a winding machine (not shown) with high tension from the nozzles 22a of the bushing 22, so that the molten glass is spun and fiberized. For example, a discharge amount of the molten glass from one nozzle 22a is 0.05 to 5.0 g/minute.

By exposing the molten glass of the first glass-melting tank 12 to the reduced-pressure atmosphere as described above, bubbles can be effectively removed from the glass. Not only the first glass-melting tank 12, the second glass-melting tank 20, and the bushing 22 but also the conduit 14 are heated. By controlling the temperatures of them separately, the glass is prevented from being solidified in the conduit 14. In other words, in producing the glass fibers, the weight of spun glass per unit time is small and the brought-in heat is also small, and accordingly, the molten glass may be cooled and solidified in the middle of the conduit 14. However, in this embodiment, the glass is prevented from being solidified in the conduit 14 due to the above-described structure.

Then, the spinning is conducted under the condition that a liquid level of the molten glass in the first glass-melting tank 12 is higher than a liquid level of the molten glass in the second glass-melting tank 20 by 150 cm or more. More preferably, it is higher by 230 to 460 cm. Due to such a height, the liquid level of the molten glass in the first glass-melting tank 12 can be reduced by approximately 0.4 to 0.9 atmosphere relative to atmospheric pressure, and a bubble diameter is rapidly increased by continuously dispersing gas in the molten glass into existing bubbles. Thus, a large defoaming effect can be obtained.

A suction amount of the sucking device 18 is controlled such that the reduced-pressure atmosphere to which the first glass-melting tank 12 is exposed, i.e., the pressure difference between the pressure in the decompression housing 316 and the atmospheric pressure, is constant. Thus, fluctuations in the liquid level of the molten glass due to tiny fluctuations of the atmospheric pressure can be suppressed.

The injection amount of the molten glass, glass gobs, or glass raw materials in the first glass-melting tank 12 is controlled based on the height of the liquid level of the molten glass in the second glass-melting tank 20 such that the height is constant. Also, the area of the liquid level of the molten glass in the second glass-melting tank 20 is equal to or larger than the area of the liquid level of the molten glass in the first glass-melting tank 12. Thus, fluctuations in the liquid level in the second glass-melting tank 20 can be reduced, and the generation of bubbles brought from the contact surface between the wall surface of the second glass-melting tank 20 and the molten glass can be suppressed. Further, variations in the diameter of the glass fiber to be spun can be suppressed, and variations in the strength or electric characteristics of a molded article due to count variations of the glass fiber can be suppressed.

As described above in detail, in the glass-melting device 300 according to this embodiment, bubbles can be removed from the molten glass by melting the glass in the first glass-melting tank 12 under reduced-pressure atmosphere. Thus, the inclusion of bubbles in the glass fibers to be spun can be effectively reduced. The conduit 14 and the conduit housing 317*b* of which temperatures are increased by heating of the conduit 14 have different extendable amounts due to the difference of their coefficients of thermal expansion and the difference of their temperatures. However, by extending or contracting the conduit housing 317*b* by the extendable housing part 360, their lengths can be the same. Thus, a load applied on the conduit 14 and the conduit housing 317*b* because of the difference of their extendable amounts by rise of their temperatures can be reduced, and therefore the damage of the conduit 14 and the conduit housing 317*b* can be prevented.

In producing glass fibers using the glass-melting device 300 according to this embodiment, the first glass-melting tank is hermetically closed by closing a lower end portion of the conduit using the molten glass as the glass fiber production starting step. Accordingly, the first glass-melting tank 12 can be exposed to the reduced-pressure atmosphere. The bubbles can be removed from the molten glass by melting the glass in the first glass-melting tank 12 under the reduced-pressure atmosphere, and therefore inclusion of the bubbles into the glass fibers to be spun can be effectively reduced.

By forming part of the heat insulating material 24 from the elastic heat insulating material 24*b*, the elastic heat insulating material 24*b* is expanded with thermal expansion of the conduit 14 and the conduit housing 317*b* and therefore the reduction of heat-insulating efficiency caused by generation of a gap of the heat insulating material 24 can be prevented.

Further, by providing the heat insulating material insertion opening 370 on the conduit housing 317*b*, another heating material 24 such as the elastic heat insulating material 24*b* can be newly inserted into the conduit housing 317*b* when the gap of the heat insulating material 24 is not buried even by the expansion of the elastic heat insulating material 24*b*. Thus, the reduction of heat-insulating efficiency caused by generation of the gap of the heat insulating material 24 can be further prevented.

[Fourth Embodiment]

Next, a fourth embodiment of the present invention will be explained below with reference to FIGS. 10 and 11. A glass-melting device 400 for producing glass fibers according to the fourth embodiment has basically the same structure as the glass-melting device 300 for producing glass fibers according to the third embodiment. The glass-melting device 400 for producing glass fibers differs from the glass-melting device 300 for producing glass fibers according to the third embodiment in that a partition member 420 partitioning the heat insulating material 24 is provided in the conduit housing 317*b*. Thus, only the differences between the third embodiment and the fourth embodiment will be explained below and an explanation of the similarities will be omitted.

Figure 10:
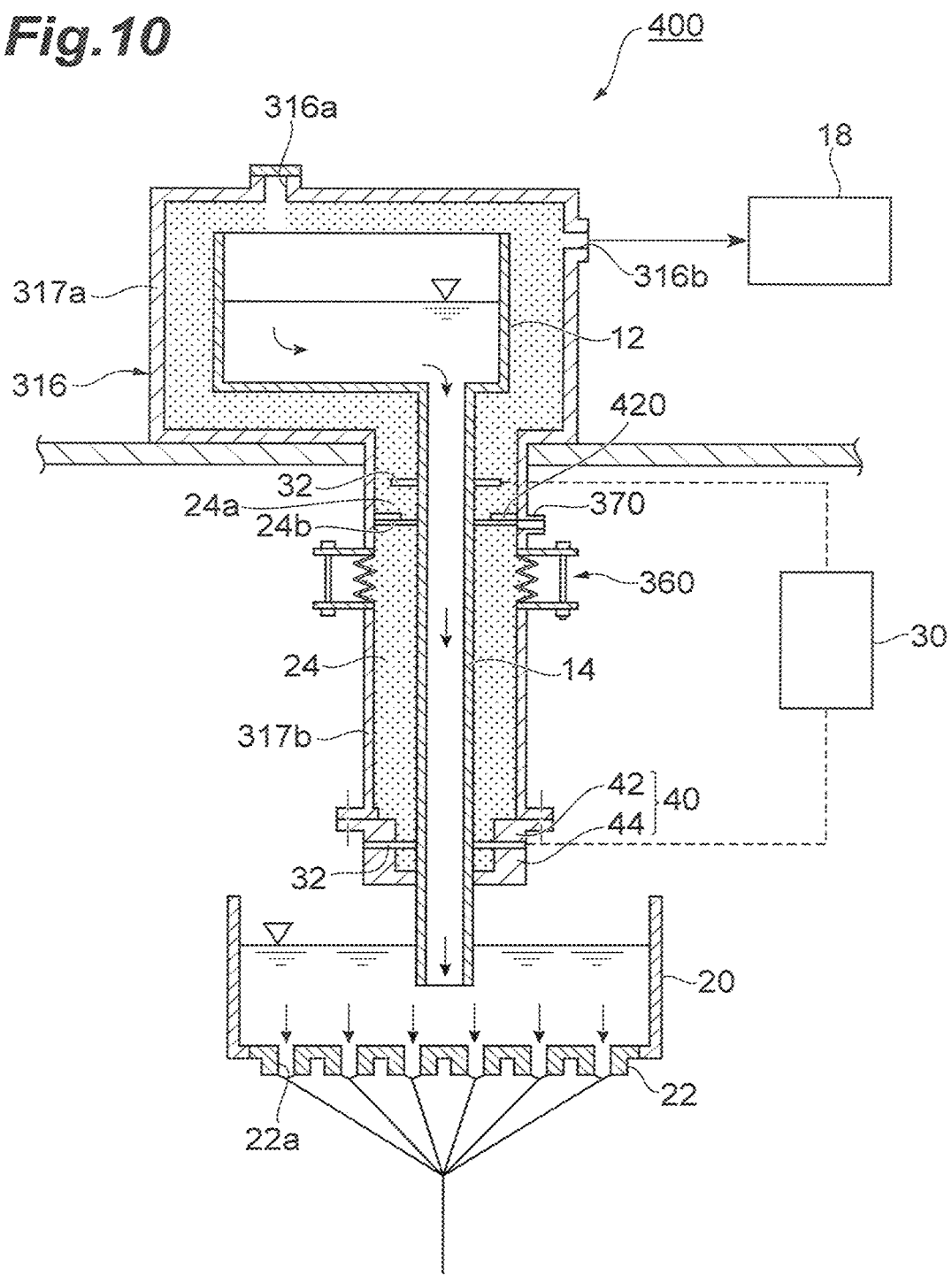
[FIG. 10]
Figure 11:
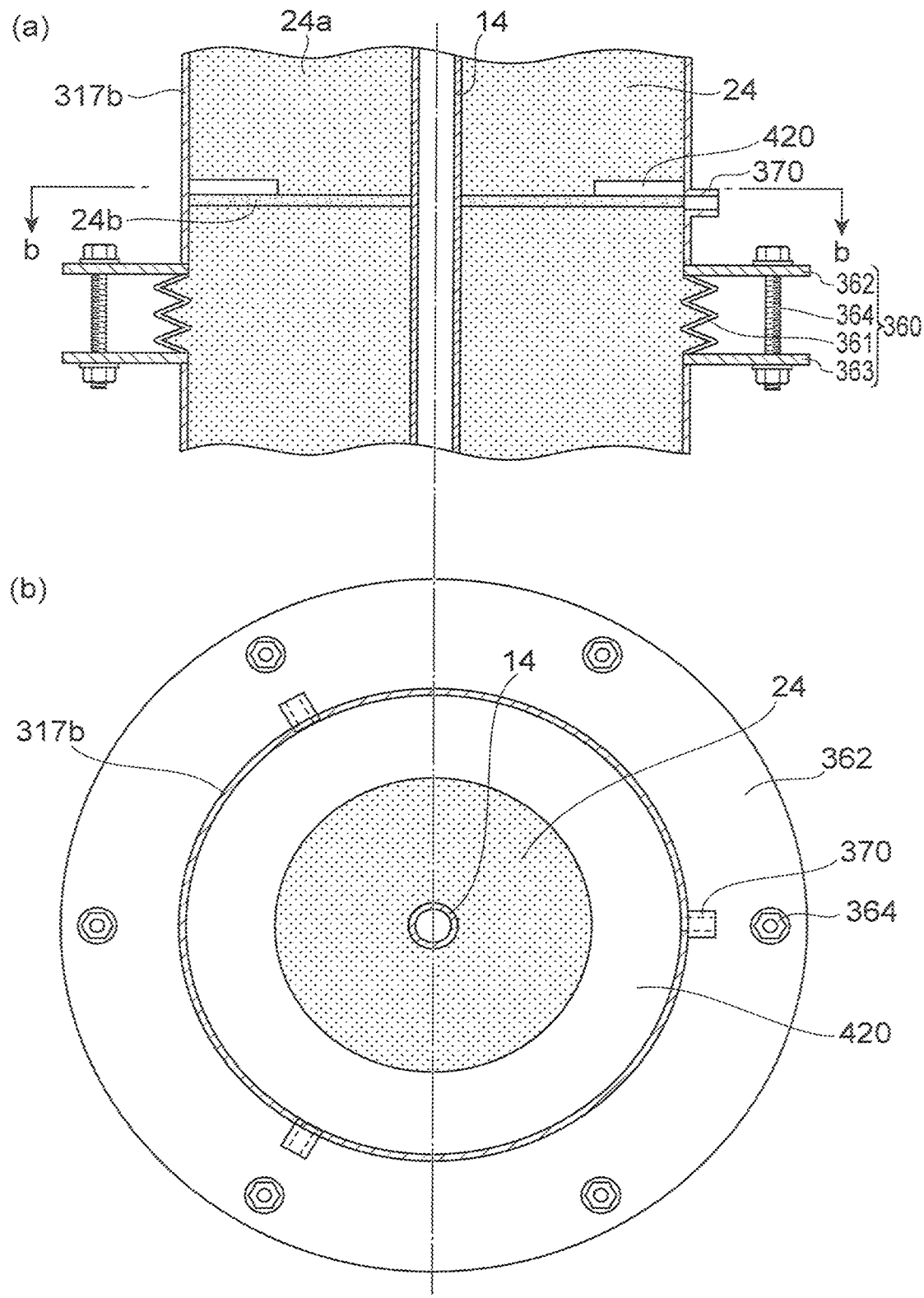
[FIG. 11]

FIG. 10 is a cross-sectional view showing the structure of the glass-melting device for producing glass fibers according to the fourth embodiment. FIGS. 11*a* and 11*b* are cross-sectional views showing part of the glass-melting device for producing glass fibers shown in FIG. 10 in an enlarged manner. FIG. 11*a* is a cross-sectional front view, and FIG. 11*b* is a cross-sectional view taken along the line b-b of FIG. 11*a*. As shown in FIGS. 10 and 11, the partition member 420 is provided in the conduit housing 317*b* in the glass-melting device 400 for producing glass fibers.

The partition member 420 partitions the heat insulating material 24 accommodated in the conduit housing 317*b*, and supports part of the heat insulating material 24 arranged on an upper portion of the partition member 420. The partition member 420 is arranged immediately above the heat insulating material insertion opening 370 and is formed in a flange-shape projecting inwardly from the inner wall of the conduit housing 317*b*. More specifically, the insulating firebricks 24*a* laminated in the conduit housing 317*b* are partitioned by the partition member 420. The insulating firebricks 24*a* arranged on the upper portion of the partition member 420 are supported by the partition member 420. Since the partition member 420 supports the insulating firebricks 24*a*, it is preferable that the insulating firebricks 24*a* be arranged as high as possible in the conduit housing 317*b*. The elastic heat insulating material 24*b* is inserted between the insulating firebricks 24*a* partitioned by the partition member 420. Accordingly, the heat insulating material insertion opening 370 is connected to the elastic heat insulating material 24*b* inserted below the insulating firebricks 24*a* supported by the partition member 420.

Next, a method for producing glass fibers using the glass-melting device 400 as described above will be explained below with reference to FIG. 12.

In the glass fiber production starting step, molten glass, glass gobs, or glass raw materials are injected into the first glass-melting tank 12 and the second glass-melting tank 20 in the same manner as in the glass-melting device 300 according to the third embodiment. The first glass-melting tank 12, the second glass-melting tank 20, and the conduit 14 are heated to melt the molten glass, glass gobs, or glass raw materials. After the lower end portion of the conduit 14 is closed by the molten glass, the pressure in the decompression housing 316 is reduced by the sucking device 18 and the liquid level of the molten glass in the conduit 14 is increased. Subsequently, the first glass-melting tank 12, the conduit 14, the second glass-melting tank 20, and the bushing 22 are heated separately and the molten glass is introduced into the second glass-melting tank 20 from the first glass-melting tank 12 through the conduit 14. Then, the molten glass is taken out of the nozzles 22*a* of the bushing 22.

The conduit 14 and the conduit housing 317*b* are extended due to thermal expansion. By further extending the conduit housing 317*b* using the extendable housing part 360, the lengths of the conduit 14 and the conduit housing 317*b* become the same.

Figure 12:
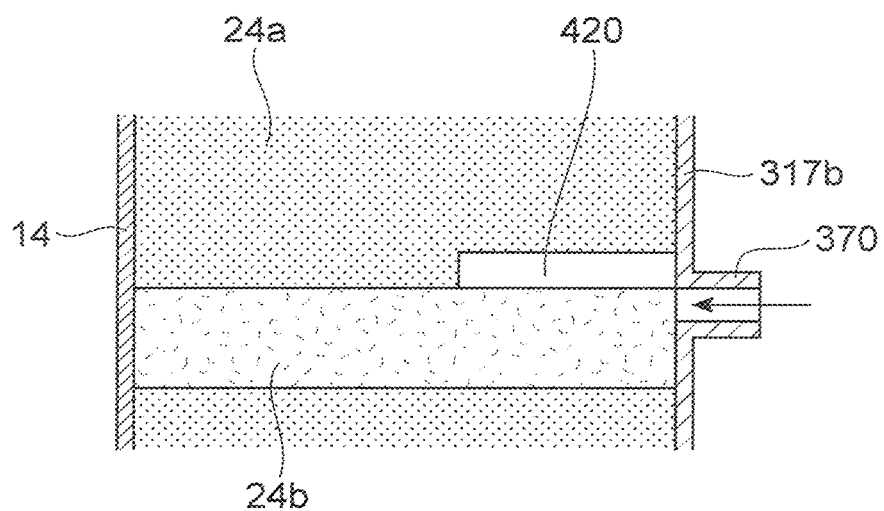
[FIG. 12]

As shown in FIG. 12, the insulating firebricks 24*a* arranged on the upper side of the partition member 420 are supported by the partition member 420 in the conduit housing 317*b*. When the conduit housing 317*b* is extended, gaps are generated between the insulating firebricks 24a partitioned by the partition member 420. These gaps between the insulating firebricks 24a are buried by the elastic heat insulating material 24b because the elastic heat insulating material 24b inserted between them is expanded. At this time, the heat insulating material insertion opening 370 is arranged immediately under the partition member 420, and therefore is communicated with the gaps formed between the insulating firebricks 24a. When the extendable amounts of the conduit 14 and the conduit housing 317b are large and thus the gaps between the insulating firebricks 24a cannot be completely buried only by expansion of the elastic heat insulating material 24b, or when the bulk density of the elastic heat insulating material 24b is small, the gaps between the insulating firebricks 24a are completely buried by newly inserting another heat insulating material 24 such as the elastic heat insulating material 24b into the conduit housing 317b from the heat insulating material insertion opening 370 before the pressure in the decompression housing 316 is reduced.

The glass fiber production starting step as described above is terminated, and then steps for producing glass fibers are performed. In other words, the molten glass is introduced into the second glass-melting tank 20 from the first glass-melting tank 12 through the conduit 14 and is wound around a winding machine (not shown) with high tension from the nozzles 22a of the bushing 22, so that the molten glass is spun and fiberized.

As described above in detail, by providing the partition member 420 in the conduit housing 317b in the glass-melting device 400 according to this embodiment, the insulating firebricks 24a arranged on the upper side of the partition member 420 are supported by the partition member 420. Accordingly, a load applied on the extendable housing part 360 provided in the conduit housing 317b can be reduced. Further, since the position of the gaps formed between the insulating firebricks 24a due to thermal expansion of the conduit 14 and the conduit housing 317b is specified, the elastic heating insulating material 24b can be inserted at an appropriate position and the heat insulating material insertion opening 370 can be arranged at an appropriate position.

Since the gaps are generated between the insulating firebricks 24a partitioned by the partition member 420 when the conduit 14 and the conduit housing 317b are thematically expanded, the gaps in the heat insulating material can be appropriately buried by inserting another elastic heat insulating material 24b between the insulating firebricks 24a partitioned by the partition member 420.

Even when the gaps are generated between the insulating firebricks 24a due to the thermal expansion of the conduit 14 and the conduit housing 317b, the elastic heat insulating material 24b can be inserted into the conduit housing 317b from the outside by providing the heat insulating material insertion opening 370 in the conduit housing 317b. Thus, the reduction of heat-insulating efficiency can be suppressed.

[Fifth Embodiment]

Figure 13:
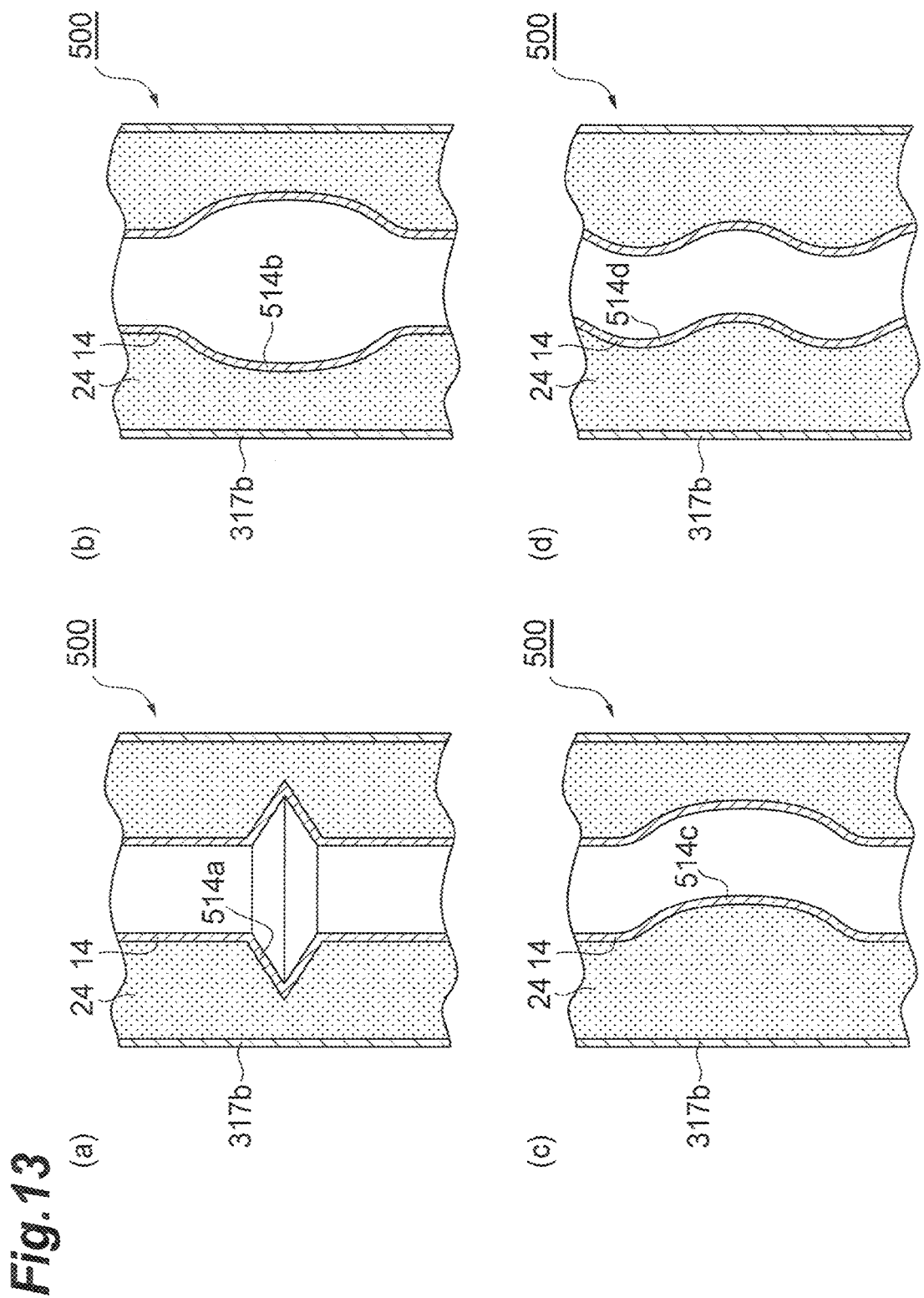
[FIG. 13]

Next, a fifth embodiment of the present invention will be explained below with reference to FIG. 13. A glass-melting device 500 for producing glass fibers according to the fifth embodiment has basically the same structure as the glass-melting device 300 for producing glass fibers according to the third embodiment. The glass-melting device 500 for producing glass fibers differs from the glass-melting device 300 for producing glass fibers according to the third embodiment only in that part of the conduit 14 is deformed. Thus, only the differences between the third embodiment and the fifth embodiment will be explained below and an explanation of the similarities will be omitted.

FIGS. 13a to 13d show part of a conduit according to the fifth embodiment in an enlarged manner. FIGS. 13a to 13d show modifications of the conduit. As shown in FIGS. 13a to 13d, extendable conduit parts 514a to 514d extending and contracting the conduit 14 in the longitudinal direction are provided in the conduit 14 in the glass-melting device 500 for producing glass fibers.

The extendable conduit parts 514a to 514d are formed by bending or curving part of the conduit 14. The shapes of the extendable conduit parts 514a to 514d are not particularly limited as long as the conduit 14 can be extended and contracted by them in the longitudinal direction, but it is preferable that the extendable conduit parts 514a to 514d be formed by bending or curving the conduit 14. For example, the extendable conduit part 514a is formed by curving the conduit 14 into concertinas as shown in FIG. 13a, the extendable conduit part 514b is formed by extending the diameter of the conduit 14 and curving the conduit 14 as shown in FIG. 13b, the extendable conduit part 514c is formed by curving the conduit 14 in one direction as shown in FIG. 13c, and the extendable conduit part 514d is formed by curving the conduit 14 in a wave-like shape as shown in FIG. 13d. Incidentally, it is only required that at least one of the extendable conduit parts 514a to 514d is formed in the conduit 14.

Incidentally, the conduit having the structure as shown in FIG. 13a is preferably manufactured because the conduit 14 is a relatively long cylinder. In view of workability for assembling the glass-melting device and transportation cost, it is preferable that the conduit be divided into two or more pieces. At this time, the divided conduits 14 are formed in a cylindrical shape in which one end or both ends are curved outwardly, or in a cylindrical shape in which a flange is provided on one end or both ends. For assembling the glass-melting device, it is preferable that distal ends of the curved portion or distal ends of the flange be welded. Thus, the glass-melting device can be assembled efficiently and the conduit 14 having the extendable conduit parts 514a to 514d can be prepared easily.

Next, a method for producing glass fibers using the glass-melting device 500 as described above will be explained below.

In the glass fiber production starting step, molten glass, glass gobs, or glass raw materials are injected into the first glass-melting tank 12 and the second glass-melting tank 20 in the same manner as in the glass-melting device 300 according to the third embodiment. The first glass-melting tank 12, the second glass-melting tank 20, and the conduit 14 are heated to melt the molten glass, glass gobs, or glass raw materials. After the lower end portion of the conduit 14 is closed by the molten glass, the pressure in the decompression housing 316 is reduced by the sucking device 18 and the liquid level of the molten glass in the conduit 14 is raised. Subsequently, the first glass-melting tank 12, the conduit 14, the second glass-melting tank 20, and the bushing 22 are heated separately and the molten glass is introduced into the second glass-melting tank 20 from the first glass-melting tank 12 through the conduit 14. Then, the molten glass is taken out of the nozzles 22a of the bushing 22.

The conduit 14 and the conduit housing 317b are extended due to thermal expansion. By adjusting the extendable housing part 360 based on a difference λ calculated by the above equation (1), the lengths of the conduit 14 and the conduit housing 317b become the same.

At this time, temperature distributions in the conduit 14 and the conduit housing 317b are not uniform in practice. A theoretical value is not always coincident with an actual phenomenon occurred in practice. Therefore, even after the extendable housing part 360 is adjusted, the lengths of the conduit 14 and the conduit housing 317b may not be coincident. Accordingly, the difference in length between the conduit 14 and the conduit housing 317b is corrected by extending or contracting the extendable conduit parts 514a to 514d formed in the conduit 14. Thus, the lengths of the conduit 14 and the conduit housing 317b become the same.

The glass fiber production starting step as described above is terminated, and then steps for producing glass fibers are performed. In other words, the molten glass is introduced into the second glass-melting tank 20 from the first glass-melting tank 12 through the conduit 14 and is wound around a winding machine (not shown) with high tension from the nozzles 22a of the bushing 22, so that the molten glass is spun and fiberized.

As described above in detail, in the glass-melting device 500 according to this embodiment, the difference in length between the conduit 14 and the conduit housing 317b is corrected by forming the extendable conduit parts 514a to 514d in the conduit 14 even when the lengths of the conduit 14 and the conduit housing 317b does not become the same by adjusting the extendable housing part 360. Thus, the lengths of the conduit 14 and the conduit housing 317b can be the same.

[Sixth Embodiment]

Next, a sixth embodiment of the present invention will be explained below with reference to FIG. 14. A glass-melting device 600 for producing glass fibers according to the sixth embodiment has basically the same structure as the glass-melting device 100 for producing glass fibers according to the first embodiment. Thus, only the differences between the first embodiment and the sixth embodiment will be explained below and an explanation of the similarities will be omitted.

Figure 14:
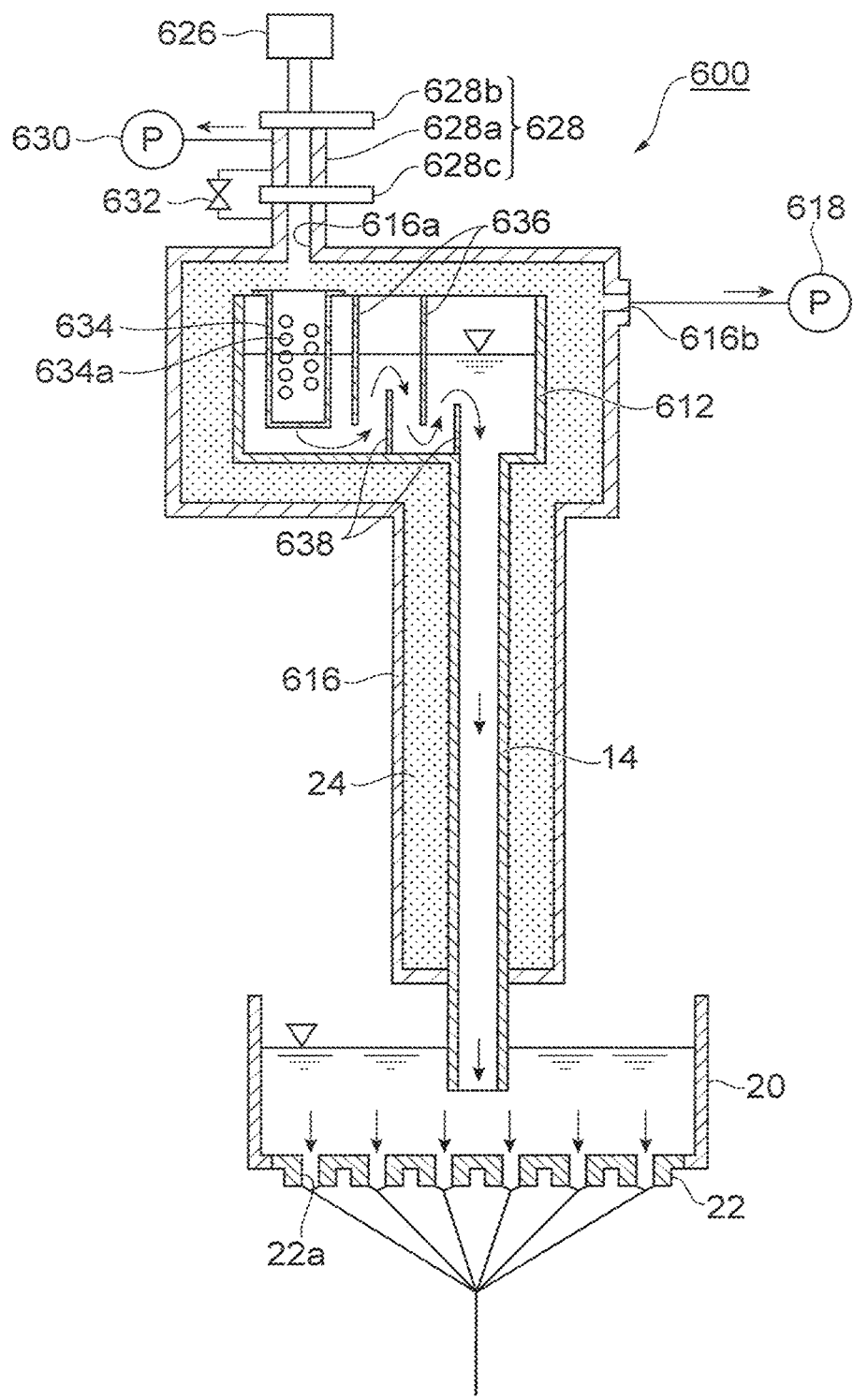
[FIG. 14]

FIG. 14 is a cross-sectional view showing the structure of the glass-melting device for producing glass fibers according to the embodiment. As shown in FIG. 14, the glass-melting device 600 for producing glass fibers includes a first glass-melting tank 612, the conduit 14, a decompression housing 616, a first sucking device 618, the second glass-melting tank 20, the bushing 22, a raw material weighing part 626, a pressure container 628, a second sucking device 630, and a pressure equalizing valve 632.

The first glass-melting tank 612 melts injected solid raw materials such as glass gobs and glass raw materials and delivers them into the conduit 14. An upper portion of the first glass-melting tank 612 is opened.

The first glass-melting tank 612 includes heating means (not shown) for melting the solid raw materials. For example, the heating means may be a burner or an electric heater. Alternatively, a current may be applied from an electrode connected to the tank and the tank may be self-heated. For self-heating, it is preferable that at least an inner wall of the tank be made of a material which produces heat when a current is applied. For example, it is preferable that it be made of platinum or platinum-alloy A basket 634 to which the solid raw materials are injected, and upper partition plates 636 and lower partition plates 638 for partitioning the first glass-melting tank 612 are provided in the first glass-melting tank 612. The basket 634, the upper partition plates 636, and the lower partition plates 638 will be explained below in detail.

The conduit 14 delivers glass which is melted in the first glass-melting tank 612 into the second glass-melting tank 20, and is formed in an elongated cylindrical shape extending downwardly from the first glass-melting tank 612.

The conduit 14 includes heating means (not shown) for heating the molten glass. The heating means is self-heated when a current is applied from electrode parts (not shown) provided on an upper portion and a lower portion of the conduit 14. Accordingly, the conduit 14 is made of a material producing heat when a current is applied. For example, it is made of platinum or platinum-alloy.

The decompression housing 616 hermetically covers the first glass-melting tank 612 and the conduit 14, while a lower end of the conduit 14 projects. The material and structure of the decompression housing 616 are not particularly limited as long as it has airtightness and strength. It is preferable that the decompression housing 616 be made of a metal material such as stainless steel.

An introduction opening 616a for introducing solid raw materials is provided on an upper wall of the decompression housing 616. A suction opening 616b connected to the first sucking device 618 for decompression is provided on a side wall of the decompression housing 616. The heat insulating material 24 is provided in a space formed between the decompression housing 616, and the first glass-melting tank 612 and the conduit 14. The heat insulating material 24 is made of a material which allows the temperature of the decompression housing 616 to be a heatproof temperature or less and maintains its structure for a long period of time. For example, the heat insulating material 24 may be made of insulating firebricks having excellent shape-retainable property and economic efficiency or an elastic heat insulating material having an elastic structure. For example, the elastic heat insulating material is a wool heat insulating material such as a fiber flux, which is made of glass wool.

The first sucking device 618 vacuum-sucks gas in the decompression housing 616 to provide a reduced-pressure atmosphere in the decompression housing 616. The first sucking device 618 is formed by a vacuum pump.

The raw material weighing part 626 weighs the solid raw materials to be injected into the first glass-melting tank 612, and is provided on an upper portion of the decompression housing 616. It is preferable that the raw material weighing part 626 be appropriately changed in accordance with the shape of the solid raw materials. When the solid raw materials are marbles or the like, a counter method for counting marbles is adopted. When the solid raw materials are cullets or batches, a weight measuring method such as load cell is adopted.

The pressure container 628 is provided on an upper portion of the decompression housing 616 for storing the solid raw materials to be injected into the first glass-melting tank 612. The pressure container 628 is connected to the raw material weighing part 626 and the introduction opening 616a of the decompression housing 616. The pressure container 628 includes a container part 628a, an upper opening-closing mechanism 628b, and a lower opening-closing mechanism 628c.

The container part 628a is a container for injecting the solid raw materials weighed to have a predetermined amount by the raw material weighing part 626 into the first glass-melting tank 612. The container part 628a is communicated with the raw material weighing part 626 via the upper opening-closing mechanism 628b, and is communicated with the introduction opening 616a of the decompression housing 616 via the lower opening-closing mechanism 628c.

The upper opening-closing mechanism 628b is provided on the side close to the raw material weighing part 626 which is the side close to an inlet of the solid raw materials in the container part 628a and is opened and closed between the container part 628a and the raw material weighing part 626. For example, the upper opening-closing mechanism 628b may be provided by a shutter or the like. When the upper opening-closing mechanism 628b is opened, the raw material weighing part 626 and the container part 628a are communicated with each other, so that the solid raw materials weighted by the raw material weighing part 626 are injected into the container part 628a. On the other hand, when the upper opening-closing mechanism 628b is closed, a space between the raw material weighing part 626 and the container part 628a is hermetically closed.

The lower opening-closing mechanism 628c is provided on the side close to the decompression housing 616 which is the side close to an outlet of the solid raw materials in the container part 628a, and is opened and closed between the container part 628a and the decompression housing 616. For example, the lower opening-closing mechanism 628c may be provided by a shutter or the like. When the lower opening-closing mechanism 628c is opened, the container part 628a and the decompression housing 616 are communicated with each other, so that the solid raw materials accommodated in the container part 628a are injected into the first glass-melting tank 612 from the introduction opening 616a of the decompression housing 616. On the other hand, when the lower opening-closing mechanism 628c is closed, a space between the container part 628a and the decompression housing 616 is hermetically closed and the decompression housing 616 is maintained to be hermetically closed.

The second sucking device 630 vacuum-sucks gas in the container part 628a to provide the reduced-pressure atmosphere in the container part 628a, which is formed by a vacuum pump.

The pressure equalizing valve 632 equalizes the pressure in the container part 628a and the pressure in the decompression housing 616. The pressure equalizing valve 632 is mounted to a pipe communicated with the container part 628a and the introduction opening 616a of the decompression housing 616 for opening and closing the pipe. When the pressure equalizing valve 632 is opened, the container part 628a and the decompression housing 616 are communicated with each other and thus the pressure in the container part 628a and the pressure in the decompression housing 616 are equalized. On the other hand, when the pressure equalizing valve 632 is closed, the container part 628a and the decompression housing 616 are separated from each other and the decompression housing 616 is maintained to be hermetically closed.

The solid raw materials injected from the pressure container 628 are injected into the basket 634. The basket 634 is arranged immediately under the introduction opening 616a to which the pressure container 628 is mounted, of which the upper portion is opened. It is preferable that at least a surface of the basket 634 be made of platinum or platinum-alloy.

The basket 634 is a container formed in a box-like shape by combining punching plates and has a plurality of openings 634a. The openings 634a are formed only on a central portion and an upper portion of the basket 634, and are not formed on a bottom surface and a lower portion of the basket 634. Since the openings 634a are not formed on the bottom surface and the lower portion of the basket 634, the molten glass can be remained in the basket 634 even when the liquid level in the first glass-melting tank 612 is reduced more than that in the basket 634 during the startup of the glass-melting device 600 or due to pressure variations. Thus, the basket 634 can be prevented from being deformed due to direct collision between the solid raw materials injected from the pressure container 628 and the basket 634, and platinum in the basket 634 can be prevented from being mixed into the molten glass as foreign matters.

The basket 634 is held to be lifted in the first glass-melting tank 612, so that its bottom portion is floated. Since the temperature of the molten glass is higher toward the upper portion from the bottom portion in the first glass-melting tank 612, the solid raw materials injected from the pressure container 628 are reliably melted at higher temperature by keeping the basket 634 to be lifted.

The upper partition plates 636 partition the upper portion of the molten glass and interfere the passage of the molten glass in the vicinity of the liquid level to allows the passage of the molten glass only in the vicinity of the bottom surface of the first glass-melting tank 612. The upper partition plates 636 are formed to cross the first glass-melting tank 612, and stand upright from a middle stage to a position higher than the liquid level of the molten glass in the first glass-melting tank 612. Thus, the molten glass can pass through only the lower side of the upper partition plates 636. Two upper partition plates 636 are provided between the basket 634 and the conduit 14.

The lower partition plates 638 partition the lower portion of the molten glass and interfere the passage of the molten glass in the vicinity of the bottom surface in the first glass-melting tank 612 to allow the passage of the molten glass only in the vicinity of the liquid level. The lower partition plates 636 are formed to cross the first glass-melting tank 612, and stand upright from the bottom surface to a position lower than the liquid level of the molten glass in the first glass-melting tank 612. Thus, the molten glass can pass through only the upper side of the upper partition plates 638. Two lower partition plates 638 are provided between the basket 634 and the conduit 14.

The upper partition plates 636 and the lower partition plates 638 are alternately arranged. The upper partition plates 636 are arranged on the side close to the basket 634, and the lower partition plates 638 are arranged on the side close to the conduit 14. It is preferable that at least surfaces of the upper partition plates 636 and the lower partition plates 638 be made of platinum or platinum-alloy.

The heating means of heating the first glass-melting tank 612, the conduit 14, the second glass-melting tank 20, and the bushing 22 can adjust their temperatures separately.

Next, a method for producing glass fibers using the glass-melting device 600 as described above will be explained below.

First, the upper opening-closing mechanism 628b, the lower opening-closing mechanism 628c, and the pressure equalizing valve 632 are closed and the pressure in the decompression housing 616 is reduced by the first sucking device 618 such that the pressure in the decompression housing 616 is reduced by 0.4 to 0.9 atmosphere relative to atmospheric pressure.

Next, the solid raw materials are injected into the raw material weighing part 626, and the raw material weighing part 626 weighs a predetermined amount of the solid raw materials. The solid raw materials are glass raw materials or glass gobs. The glass materials are powdery mixture of clay, limestone, dolomite, colemanite, silica sand, alumina, calcium carbonate, sodium carbonate, and the like. The glass gobs are prepared by cooling and solidifying the molten glass in a marble-like shape or cullet-like shape.

Subsequently, only the upper opening-closing mechanism 628b is opened while the lower opening-closing mechanism 628c is closed to inject the solid raw materials weighted by the raw material weighing part 626 into the container part 628a. Then, the container part 628a is hermetically closed by closing the upper opening-closing mechanism 628b. The pressure in the container part 628a is reduced by the second sucking device 630 such that the pressure in the container part 628a is reduced by 0.4 to 0.9 atmosphere relative to atmospheric pressure. At this time, the pressure in the decompression housing 616 may not be coincident with the pressure in the container part 628a due to individual difference between the first sucking device 618 and the second sucking device 630. Therefore, the pressure in the decompression housing 616 and the pressure in the container part 628a are equalized by opening the pressure equalizing valve 632. Then, only the lower opening-closing mechanism 628c is opened while the upper opening-closing mechanism 628b is closed, so that the solid raw materials accommodated in the container part 628a are dropped and injected into the first glass-melting tank 612 from the introduction opening 616a of the decompression housing 616. At this time, the solid raw materials are injected into the basket 634 provided in the first glass-melting tank 612.

The first glass-melting tank 612 is heated such that the temperature of the molten glass becomes 1350 to 1550 degrees C. to melt the solid raw materials. The solid raw materials injected into the basket 634 are melted in the first glass-melting tank 612, and the molten glass is delivered into the first glass-melting tank 612 from the openings 634a of the basket 634. Then, the molten glass flows on the lower portion of the upper partition plates 636 and climbs over the upper portion of the lower partition plates 638 to be delivered into the conduit 14.

Further, the conduit 14, the second glass-melting tank 20, and the bushing 22 are heated separately. The temperature of the conduit 14 is 1300 to 1450 degrees C., the temperature of the second glass-melting tank 20 is 1290 to 1400 degrees C., and the temperature of the bushing 22 is 1250 to 1300 degrees C. It is preferable that the temperatures be controlled such that the temperature of the molten glass in the first glass-melting tank 612 is higher than the temperatures of the molten glass in the conduit 14, the second glass-melting tank 20, and the bushing 22. Thus, the generation of bubbles due to reboiling can be suppressed.

Next, the molten glass is introduced into the second glass-melting tank 20 from the first glass-melting tank 612 through the conduit 14. The molten glass is wound around a winding machine (not shown) with high tension from the nozzles 22a of the bushing 22, so that the molten glass is spun and fiberized. For example, a discharge amount of the molten glass from one nozzle 22a is 0.05 to 5.0 g/minute.

The molten glass in the first glass-melting tank 612 is exposed to the reduced-pressure atmosphere as described above, so that bubbles can be effectively removed from the glass. Also, not only the first glass-melting tank 612, the second glass-melting tank 20, and the bushing 22 but also the conduit 14 are heated. By controlling the temperatures of them separately, the glass is prevented from being solidified in the conduit 14. In other words, in producing the glass fibers, the weight of spun glass per unit time is small and the brought-in heat is also small, and accordingly, the molten glass may be cooled and solidified in the middle of the conduit 14. However, in this embodiment, the glass is prevented from being solidified in the conduit 14 due to the above-described structure.

Then, the spinning is conducted under the condition that a liquid level of the molten glass in the first glass-melting tank 612 is higher than a liquid level of the molten glass in the second glass-melting tank 20 by 150 cm or more. More preferably, it is higher by 230 to 460 cm. Due to such a height, the liquid level of the molten glass in the first glass-melting tank 612 can be reduced by approximately 0.4 to 0.9 atmosphere relative to atmospheric pressure. Gas in the molten glass is continuously dispersed in existing bubbles and a bubble diameter is rapidly increased. Thus, a large defoaming effect can be obtained.

A suction amount of the first sucking device 618 is controlled such that the reduced-pressure atmosphere to which the first glass-melting tank 612 is exposed, i.e., the difference between the pressure in the decompression housing 616 and the atmospheric pressure, is constant. Thus, fluctuations in the liquid level of the molten glass due to tiny fluctuations of the atmospheric pressure can be suppressed.

Further, the amount of the solid raw materials injected into the first glass-melting tank 612 is controlled based on the height of the liquid level of the molten glass in the second glass-melting tank 20 such that the height is constant. Also, the area of the liquid level of the molten glass in the second glass-melting tank 20 is equal to or larger than the area of the liquid level of the molten glass in the first glass-melting tank 612. Thus, fluctuations in the liquid level in the second glass-melting tank 20 can be reduced, and the generation of bubbles brought from the contact surface between the wall surface of the second glass-melting tank 20 and the molten glass can be suppressed. Further, variations in the diameter of the glass fiber to be spun can be suppressed, and variations in the strength or electric characteristics of a molded article due to count variations of the glass fiber can be suppressed.

As described above in detail, in the glass-melting device 600 according to this embodiment, the bubbles can be removed from the molten glass by melting the solid raw materials in the first glass-melting tank 612 under the reduced-pressure atmosphere. Thus, the inclusion of bubbles into the glass fibers to be spun can be effectively reduced. Further, the solid raw materials are injected into the container part 628a while the lower opening-closing mechanism 628c is closed, and the pressure in the container part 628a is reduced while the upper opening-closing mechanism 628b and the lower opening-closing mechanism 628c are closed. The solid raw materials are injected into the first glass-melting tank 612 by opening only the lower opening-closing mechanism 628c. Thus, the solid raw materials can be injected into the first glass-melting tank 612 without exposing the first glass-melting tank 612 to atmospheric pressure, so that the pressure fluctuations in the first glass-melting tank 612 can be suppressed. Since fluctuations in the liquid level of the molten glass in the first glass-melting tank 612 are suppressed, the generation of bubbles brought from the contact surface between the wall surface of the first glass-melting tank 612 and the molten glass can be suppressed. Since fluctuations in the liquid level of the molten glass in the first glass-melting tank 612 are suppressed, fluctuations in the liquid level of the molten glass in the second glass-melting tank 20 are also suppressed. Accordingly, the generation of the bubbles brought from the contact surface between the wall surface of the second glass-melting tank 20 and the molten glass can be also suppressed. Further, variations in the diameter of the glass fiber to be spun can be suppressed, and variations in the strength or electric characteristics of a molded article due to count variations of the glass fiber can be suppressed.

When the solid raw materials are directly injected into the first glass-melting tank 612, the raw materials may not remain for an enough time to remove bubbles from the molten glass because of the fast flow on the bottom portion of the first glass-melting tank 612. However, by providing the basket 634 immediately under the introduction opening 616a of the decompression housing 616, the solid raw materials injected from the pressure container 628 are flowed out from the openings 634a and are delivered into the conduit 14 from the first glass-melting tank 612 after being melted in the basket 634. Thus, the enough remaining time for removing the bubbles from the molten glass in the first glass-melting tank 612 can be ensured, and therefore the inclusion of bubbles into the glass fibers to be spun can be effectively reduced.

By providing the upper partition plates 636 in the first glass-melting tank 612, the upper partition plates 636 can prevent the bubbles removed from the molten glass from flowing along with the flow of the molten glass. Accordingly, the bubbles can be prevented from flowing into the conduit 14. Thus, the inclusion of bubbles into the glass fibers to be spun can be effectively reduced.

Also, by providing the lower partition plates 638 in the first glass-melting tank 612, the molten glass which is melted in the first glass-melting tank 612 flows into the conduit 14 after climbing over the lower partition plates 638. Accordingly, the sufficient remaining time for removing bubbles from the molten glass can be ensured, while the bubbles removed from the molten glass can be prevented from flowing into the conduit 14 with the fast flow on the bottom portion of the first glass-melting tank 612. Thus, the inclusion of bubbles into the glass fibers to be spun can be effectively reduced. Further, since the lower partition plates 638 interfere the passage of the solid raw materials which are not completely melted, these solid raw materials can be prevented from flowing into the conduit 14.

Figure 15:
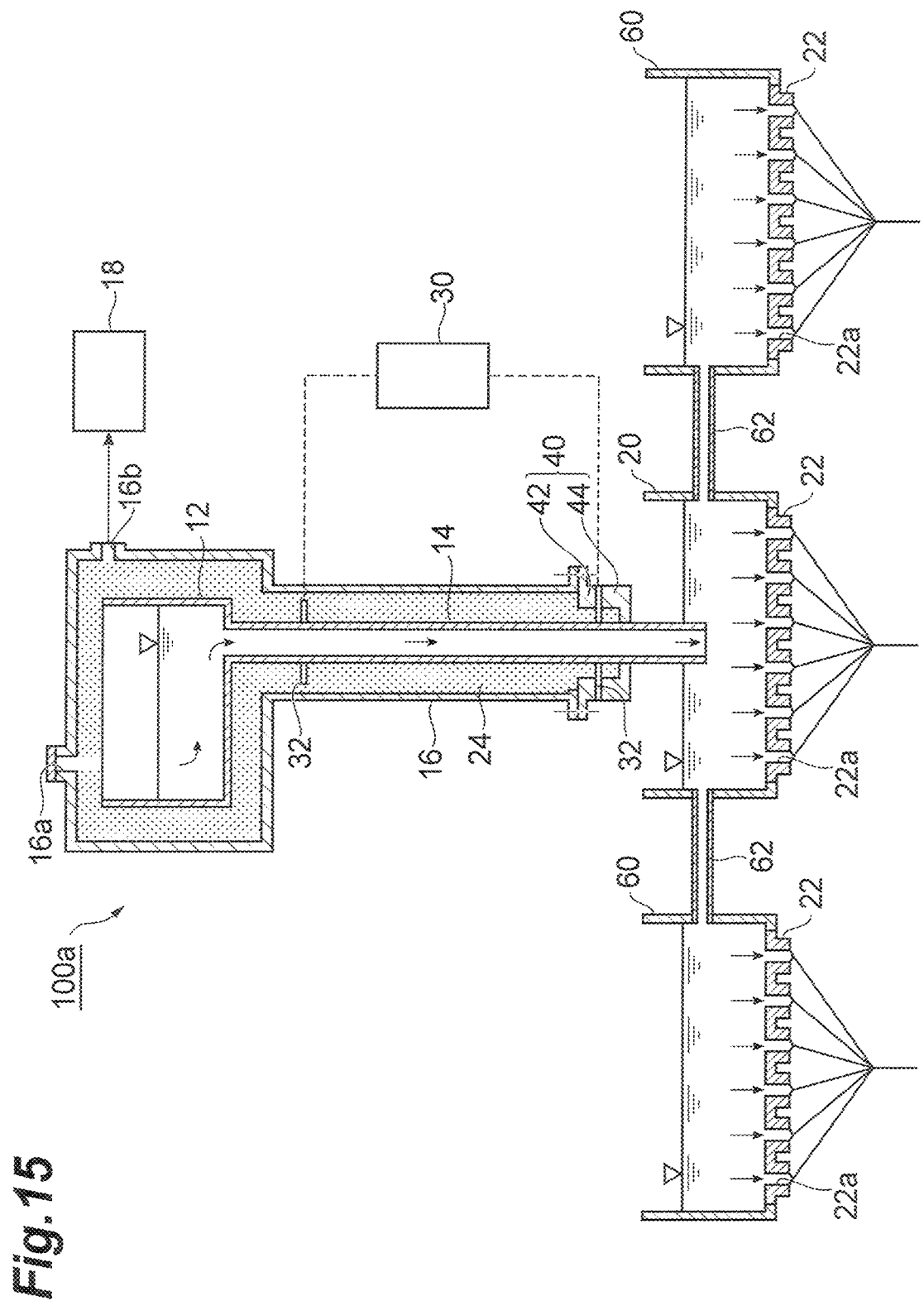
[FIG. 15]

The embodiments of the present invention are described above, but the present invention is not limited to the above-described embodiments. Various modifications can be made to the present invention. For example, although the molten glass is supplied from one first glass-melting tank 12 into one second glass-melting tank 20 and is spun in the first embodiment, a third glass-melting tank 60 provided with the bushing 22 having a number of nozzles 22a at the bottom may be provided as in a glass-melting device 100a shown in FIG. 15.

The structure of the third glass-melting tank 60 is the same as that of the second glass-melting tank 20. The glass-melting device 100a includes a plurality of third glass-melting tanks 60. The upper portions of the third glass-melting tanks 60 are opened, and the third glass-melting tanks 60 are exposed to the atmospheric-pressure atmosphere. The second glass-melting tank 20 and the third glass-melting tanks 60 are communicated with each other by communication tubes 62, so that the molten glass is supplied into the third glass-melting tanks 60 from the second glass-melting tank 20. It is preferable that the communication tubes 62 and the third glass-melting tanks 60 each have heating means for controlling their temperatures separately.

Since the glass-melting device 100a includes the third glass-melting tanks 60, one first glass-melting tank 12 can be shared. Thus, more glass fibers can be produced more efficiently. Even in the event of a failure of the second glass-melting tank 20 or one third glass-melting tank 60, the temperature of the bushing on the lower portion of the melting tank in which the failure occurs is reduced and the spinning is stopped. The spinning can be continued from the nozzles of the bushings on the lower portions of the second melting tank and the other third melting tanks.

Further, more third glass-melting tanks 60 may be provided, and the third glass-melting tanks 60 may be communicated with each other via the communication tubes 62. For reducing fluctuations in the liquid level in the second and third glass-melting tanks 20 and 60, it is preferable that the areas of the liquid levels of the molten glass in the second and third glass-melting tanks 20 and 60 be substantially the same, and the total of the areas of the liquid levels of the molten glass in the second and third glass-melting tanks 20 and 60 be equal to or larger than the area of the liquid level of the molten glass in the first glass-melting tank 12.

Figure 16:
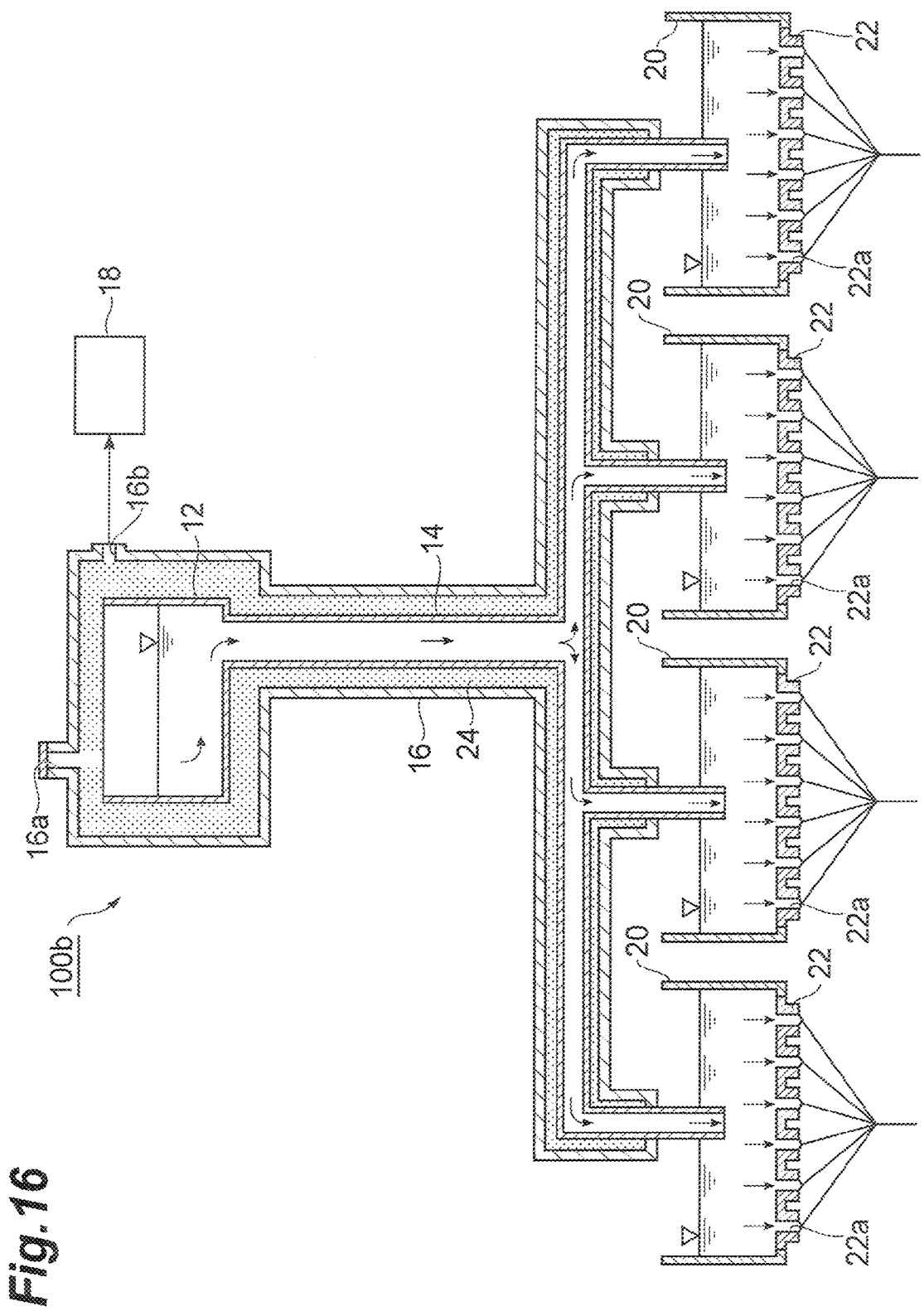
[FIG. 16]

A plurality of second glass-melting tanks 20 into which the molten glass is directly supplied from the conduit 14 may be provided as in the glass-melting device 100b shown in FIG. 16. At this time, the conduit 14 is divided into the number of the second glass-melting tanks 20 in the middle. One first glass-melting tank 12 can be shared by them, and therefore more glass fibers can be produced more efficiently. The second glass-melting tanks 20 may be communicated with each other via the communication tubes.

For reducing fluctuations in the liquid level in the plurality of second glass-melting tanks 20, it is preferable that the areas of the liquid levels of the molten glass in the second glass-melting tanks 20 be substantially the same and the total of the areas of the liquid levels of the molten glass in the plurality of second glass-melting tanks 20 be equal to or larger than the area of the liquid level of the molten glass in the first melting tank.

Although the molten glass is supplied from one first glass-melting tank 12 into one second glass-melting tank 20 for spinning in the first embodiment, the molten glass may be supplied from a plurality of first glass-melting tanks 12 into one second glass-melting tank 20. In the event of a failure of supply of the molten glass in one first glass-melting tank 12, the molten glass is cooled and solidified in the first glass-melting tank 12 in which the failure occurs and the conduit 14 on the lower portion. Accordingly, the spinning can be continued by the supply of the molten glass from the other first glass-melting tanks 12 while the supply of the molten glass from one first glass-melting tank 12 is stopped. For reducing fluctuations in the liquid level in the second glass-melting tank 20, it is preferable that the areas of the liquid levels of the molten glass in the first glass-melting tanks 12 be substantially the same and the area of the liquid level of the molten glass in the second glass-melting tank 20 be equal to or larger than the total of the areas of the liquid levels of the molten glass in the plurality of first glass-melting tanks 12.

Figure 17:
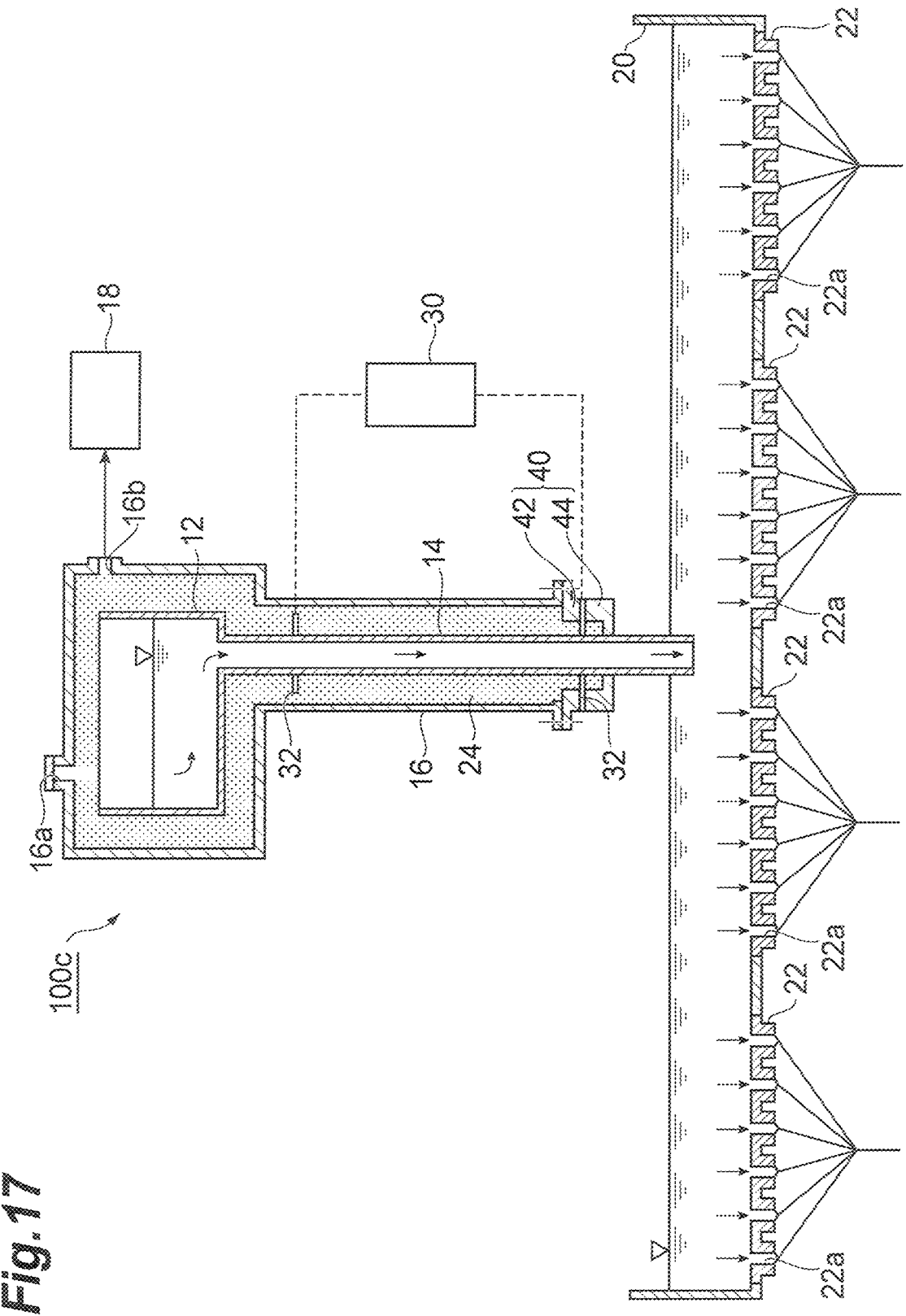
[FIG. 17]
Figure 18:
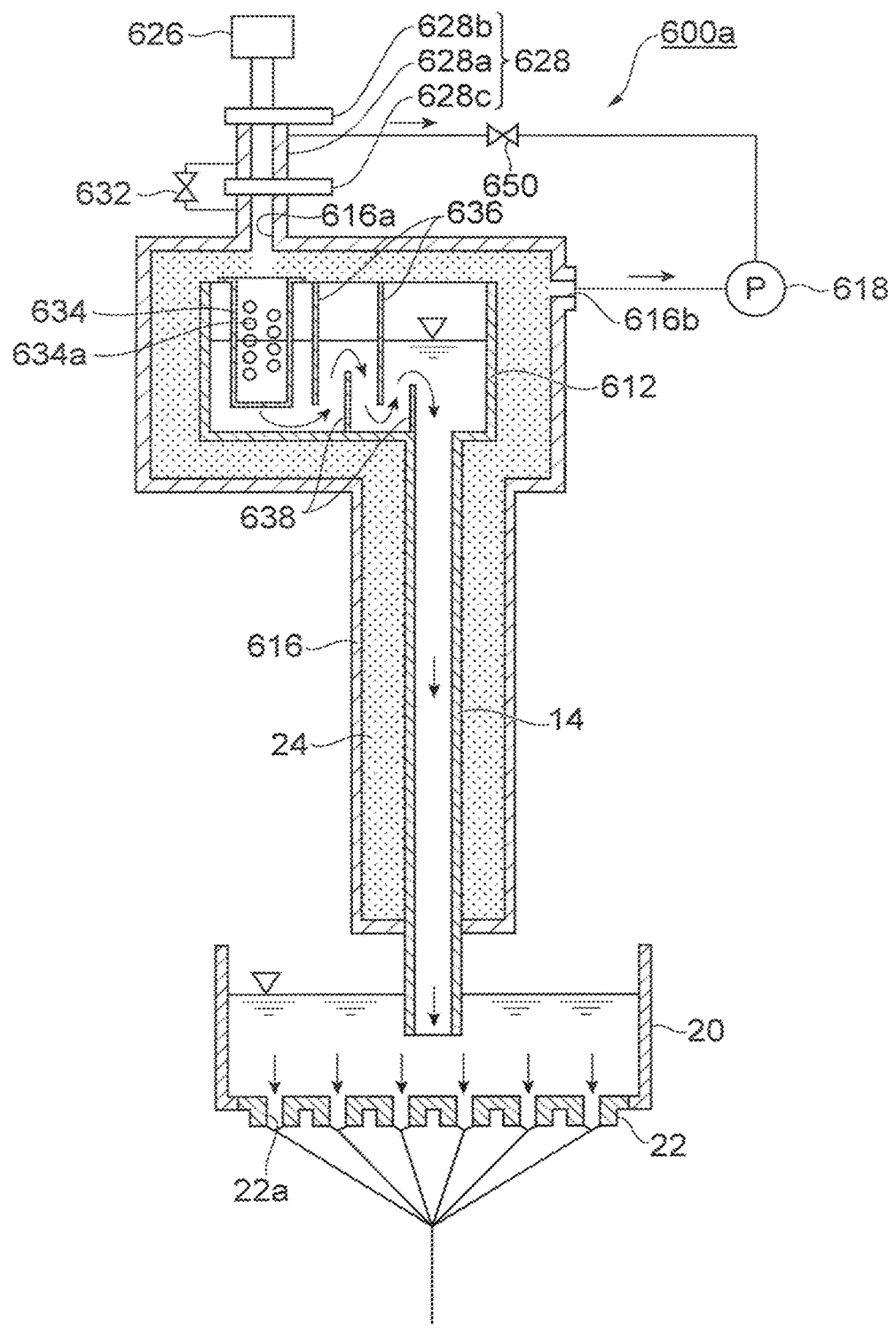
[FIG. 18]

Although one bushing 22 is provided in the second glass-melting tank 20 in the first embodiment, the second glass-melting tank 20 may be enlarged and a plurality of bushings 22 may be provided at the bottom as in the glass-melting device 100c shown in FIG. 17. Even in the event of a failure of one bushing 22, the spinning can be continued from other bushings 22 and thus the glass fibers can be stably produced.

A plurality of glass-melting devices 100 as shown in FIG. 1 and a plurality of glass-melting devices 100c as shown in FIG. 17 may be arranged in parallel and the second glass-melting tanks of them may be communicated with each other via communication tubes. Even in the event of a failure of the first melting tank or the conduit, or a failure of the second melting tank or the communication tubes, the glass fibers can be produced stably and continuously without stopping the operation.

Although the insulating firebricks 24a and the elastic heat insulating materials 24b are accommodated in the conduit housing 317b in the third and fourth embodiments, only the insulating firebricks 24a may be accommodated in an initial state, and the elastic heat insulating materials 24b may be inserted from the heat insulating material insertion opening 370 when the conduit 14 and the conduit housing 317b are thermally expanded.

Although the partition member 420 is formed in a flange-like shape projecting inwardly from the inner wall of the conduit housing 317b in the fourth embodiment, the shape thereof is not limited as long as the partition member 420 partitions the heat insulating material 24 while supporting the heat insulating material 24. The partition member 420 may be formed in a tongue piece shape or a rectangular plate shape projecting inwardly from the inner wall of the conduit housing 317b.

Although the pressure in the container part 628a of the pressure container 628 is reduced by the second sucking device 630 in the sixth embodiment, the pressure in the container part 628a of the pressure container 628 may be reduced by the first sucking device 618. At this time, a valve 650 is mounted to a pipe communicating the first sucking device 618 and the container part 628a. The valve 650 is usually closed and is opened only when the pressure in the container part 628a is reduced. Due to such a structure, the pressure in the first glass-melting tank 612 can be easily coincident with the pressure in the container part 628a. Further, since the pressures in both the first glass-melting tank 612 and the container part 628a can be reduced only by the first sucking device 618, the cost can be reduced.

Figure 19:
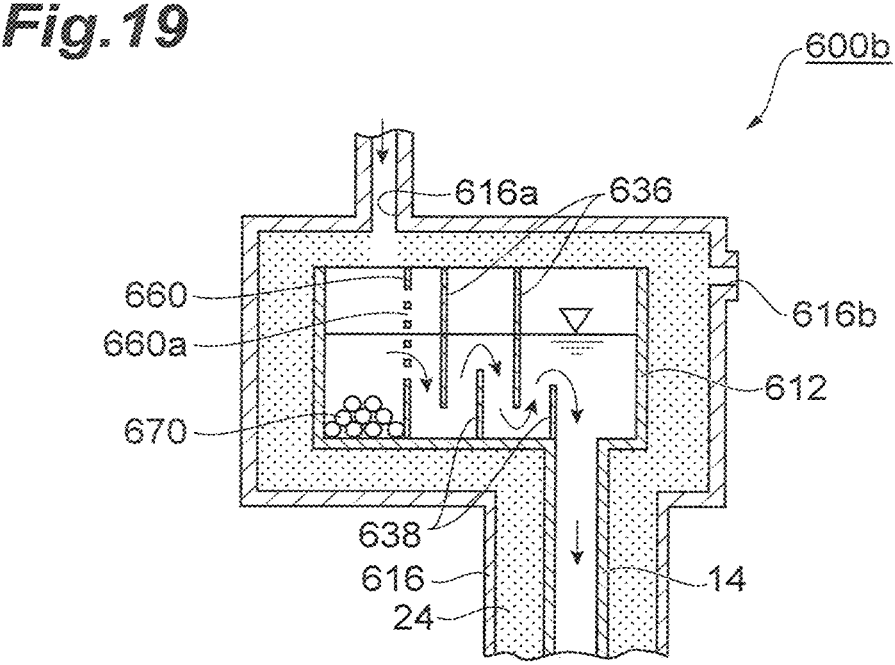
[FIG. 19]

Although the basket 634 is provided immediately under the introduction opening 616a in the sixth embodiment, a partition plate 660 partitioning the first glass-melting tank 612 may be provided instead of the basket 634 as in the glass-melting device 600b as shown in FIG. 19. The partition plate 660 is positioned closer to the introduction opening 616a than the upper partition plates 636 and the lower partition plates 638 and is arranged on the upper stream of the upper partition plates 636 and the lower partition plates 638. The partition plate 660 extends upward from the bottom surface of the first glass-melting tank 612 to cross the first glass-melting tank 612. A plurality of openings 660a are formed on the central portion and the upper portion. Thus, the openings 660a are arranged in the vicinity of the liquid level of the molten glass.

Due to such a structure, solid raw materials 670 injected into the first glass-melting tank 612 are melted while accommodated in a region partitioned by the partition plate 660. Then, only the molten glass is delivered into the conduit 14 from the openings 660a. The openings 660a are not formed on the lower portion of the partition plate 660. Therefore, the molten glass can be remained in the region immediately under the introduction opening 616a partitioned by the partition plate 660 even when the liquid level in the first glass-melting tank 612 is reduced more than basket 634 during the startup of the glass-melting device 600 or due to pressure variations. Thus, the first glass-melting tank 612 can be prevented from being deformed due to direct collision between the solid raw materials injected from the pressure container 628 and the first glass-melting tank 612, and platinum in the first glass-melting tank 612 can be prevented from being mixed into the molten glass as foreign matters.

Although the pressure equalizing valve 632 is provided for equalizing the pressure in the container part 628a and the pressure in the decompression housing 616 in the sixth embodiment, the pressure in the container part 628a and the pressure in the decompression housing 616 may be equalized by slightly opening the lower opening-closing mechanism 628c.

Although two pairs of upper partition plates 636 and lower partition plates 638 are provided in the sixth embodiment, the number, combination, or arrangement method thereof can be appropriately decided. For example, one pair of them may be provided or one of them may be provided.

EXAMPLES

Next, a verification test and its test results for checking a defoaming effect when glass fibers are produced by using the glass-melting device 100 as shown in FIG. 1 will be explained.

In the verification test, E-glass marbles were directly injected into the first glass-melting tank 12 in the glass-melting device 100 as shown in FIG. 1. The melting and defoaming under reduced-pressure were conducted simultaneously, and the melting and spinning of glass fibers were conducted by the bushing 22 via the conduit 14 and the second glass-melting tank 20. It was confirmed that the glass fibers was favorably obtained by spinning the molten glass at high speed in the glass-melting device 100. To check the defoaming effect, the molten glass was delivered downward from the nozzles 22a of the bushing 22 in the second melting tank to have a bead-like shape and the number of bubbles mixed in the bead was observed by a microscope In case that the injection amount of raw materials was not coincident with the flow rate discharged from the nozzles 22a of the bushing 22 due to variations in the injection amount of raw materials, the area of the liquid level in the second glass-melting tank 20 was equivalent to the area of the liquid level in the first glass-melting tank 12 (34000 mm$^2$). Accordingly, fluctuations in the liquid level in the second glass-melting tank 20 were easily controlled, and effects on a fiber diameter of the glass fiber due to the variations in the injection amount of raw materials were reduced.

After a normal operation for melting and spinning by defoaming under reduced-pressure, the molten glass discharged from the nozzles 22a of the bushing 22 was held to have a bead-like shape and then was collected.

Conditions for conducting the verification test were shown in Table 1.

TABLE 1

| Type of glass | E-glass |
| --- | --- |
| pressure in first glass-melting tank | 0.3 atm |
| pressure in second glass-melting tank | 1.0 atm (atmospheric pressure) |
| height of liquid level in first glass-melting tank relative to liquid level in second glass-melting tank | 290 cm |
| control temperature (first glass-melting tank) | 1470° C. |
| control temperature (conduit) | 1400° C. |
| control temperature (second glass-melting tank, bushing) | 1290° C. |
| total discharge rate from 400 nozzles | 50 g/min |
| area of liquid level in first glass-melting tank | 340 cm$^2$ |
| area of liquid level in second glass-melting tank | 340 cm$^2$ |
| cross-sectional area of conduit | 5 cm$^2$ |

50 kg of glass beads in which one glass bead has approximately 3 to 10 g (average of 6 g) was observed by a microscope, and the number of bubbles in the beads was checked. The number of bubbles was one/kg.

Glass marbles having the same weight as that of molten glass in the first melting tank, the conduit, and the second melting tank were melted in a separate melting tank under the atmospheric pressure, and the number of bubbles of the obtained glass marbles was checked in the same manner. The number of bubbles was approximately 100/kg. Thus, it was confirmed that the defoaming effect in the glass-melting device 100 due to defoaming under reduced pressure was high.

FIGS. 20a and 20b are microscope photographs of a glass gob prepared by melting glass only under atmospheric pressure and flowing the molten glass downward from nozzles of a bushing due to hydrostatic pressure of the glass (FIG. 20a), and of a glass gob prepared by defoaming molten glass under reduced pressure and melting the glass in the glass-melting device 100 shown in FIG. 1 and flowing the molten glass downwardly (FIG. 20b). As shown in FIG. 20, it was confirmed that a remarkable defoaming effect was obtained when the molten glass was defoamed under the reduced pressure and spun in the glass-melting device 100 according to this embodiment.

INDUSTRIAL APPLICABILITY

The present invention is applicable as a glass-melting device for producing glass fibers which melts glass raw materials for spinning of the glass fibers.

REFERENCE SIGNS LIST 100, 100a, 100b, 100c, 200, 300, 400, 500, 600, 600a, 600b . . . glass-melting device for producing glass fibers (glass-melting device); 12 . . . first glass-melting tank; 14 . . . conduit, 16 . . . decompression housing, 16a . . . introduction opening; 16b . . . suction opening; 18 . . . sucking device (first sucking device); 20 . . . second glass-melting tank; 22 . . . bushing; 22a . . . nozzle; 24 . . . heat insulating material; 24a . . . insulating firebrick; 24b . . . elastic heat insulating material; 30 . . . heating means; 32 . . . electrode part; 40 . . . flange; 42 . . . upper flange; 44 . . . lower flange; 46 . . . packing; 48 . . . O-ring; 50 . . . water-cooled tube; 60 . . . third glass-melting tank; 62 . . . communication tube; 214 . . . conduct; 214a . . . conduct branch part; 316 . . . decompression housing; 316a . . . introduction opening; 316b . . . suction opening; 317a . . . melting-tank housing; 317b . . . conduit housing; 360 . . . extendable housing part; 361 . . . bellows portion; 362 . . . first flange portion; 363 . . . second flange portion; 364 . . . support portion; 370 . . . heat insulating material insertion opening; 420 . . . partition member; 514a to 514d . . . extendable conduit part; 612 . . . first glass-melting tank; 616 . . . decompression housing; 616a . . . introduction opening; 616b . . . suction opening; 618 . . . first sucking device; 626 . . . raw material weighing part; 628 . . . pressure container (injection container); 628a . . . container part; 628b . . . upper opening-closing mechanism (first opening-closing mechanism); 628c . . . lower opening-closing mechanism (second opening-closing mechanism); 630 . . . second sucking device; 632 . . . pressure equalizing valve; 634 . . . basket (melting-tank inner container); 634a . . . opening; 636 . . . upper partition plate; 638 . . . lower partition plate; 650 . . . valve; 660 . . . partition plate; 660a . . . opening; 670 . . . solid raw material.

The invention claimed is:

1. A glass-melting device for producing glass fibers, comprising:
   a first glass-melting tank;
   a conduit extending downwardly from the first glass-melting tank;
   a first sucking device for exposing the first glass-melting tank to a reduced-pressure atmosphere;
   a second glass-melting tank provided on a lower portion of the conduit and exposed to an atmospheric-pressure atmosphere; and
   a bushing provided on a bottom portion of the second glass-melting tank and having a number of nozzles,
   a heat insulating material accommodated in a decompression housing, wherein the first glass-melting tank and the conduit are covered with the decompression housing in which a pressure is reduced by the first sucking device,
   a partition member for partitioning the heat insulating material in the decompression housing, and
   a heat insulating material insertion opening for inserting an elastic heat insulating material into the decompression housing, wherein the heat insulating material insertion opening is formed immediately under the partition member.

2. The glass-melting device for producing glass fibers according to claim 1, wherein
   each of the first glass-melting tank, the conduit, the second glass-melting tank, and the bushing has heating means for adjusting a temperature separately.

3. The glass-melting device for producing glass fibers according to claim 2, wherein
   an electrode part is provided on each of an upper portion of the conduit or the first glass-melting tank and a lower portion of the conduit, and the conduit is heated when a current is applied.

4. The glass-melting device for producing glass fibers according to claim 2, wherein
   a conduit branch part branches and extends upward from the lower portion of the conduit,
   an electrode part is provided on each of the upper portion of the conduit or the first glass-melting tank and the conduit branch part, and
   the conduit and the conduit branch part are heated when a current is applied.

5. The glass-melting device for producing glass fibers according to claim 1, wherein
   the lower portion of the conduit and the decompression housing are connected via a flange having water-cooled tubes.

6. The glass-melting device for producing glass fibers according to claim 1, wherein
   at least inner surfaces of the first glass-melting tank, the conduit, and the second glass-melting tank are made of platinum or platinum-alloy.

7. The glass-melting device for producing glass fibers according to claim 1, wherein
   a plurality of bushings are provided on a bottom portion of the second glass-melting tank.

8. The glass-melting device for producing glass fibers according to claim 1, further comprising:
   a third glass-melting tank having a bushing with a number of nozzles provided on a bottom portion and exposed to an atmospheric-pressure atmosphere; and
   a communication tube that communicates between the second glass-melting tank and the third glass-melting tank.

9. The glass-melting device for producing glass fibers according to claim 1, further comprising:
   heating means for heating the first glass-melting tank, the conduit, the second glass-melting tank, and the bushing separately, wherein
   an extendable housing part which is extendable and retractable is provided in the decompression housing.

10. The glass-melting device for producing glass fibers according to claim 9, wherein
    at least part of the heat insulating material is an elastic heat insulating material having elasticity.

11. The glass-melting device for producing glass fibers according to claim 10, wherein
    the elastic heat insulating material is accommodated in the vicinity of the partition member.

12. The glass-melting device for producing glass fibers according to claim 9, wherein
    an extendable conduit part for extending and retracting the conduit by being bent or curved is formed in the conduit.

13. The glass-melting device for producing glass fibers according to claim 1, further comprising:

an injection container connected to the decompression housing for accommodating solid raw materials to be injected into the first glass-melting tank, which includes a first opening-closing mechanism provided on a side close to an inlet of the solid raw materials and a second opening-closing mechanism provided on a side close to an outlet of the solid raw materials; and a second sucking device that reduces a pressure in the injection container.

14. The glass-melting device for producing glass fibers according to claim 13, wherein a melting-tank inner container which has an opening and is arranged at a position where the solid raw materials are injected from the injection container is provided in the first glass-melting tank.

15. The glass-melting device for producing glass fibers according to claim 1, wherein an upper partition plate for partitioning an upper portion of the molten glass is provided in the first glass-melting tank.

16. The glass-melting device for producing glass fibers according to claim 1, wherein a lower partition plate for partitioning a lower portion of the molten glass is provided in the first glass-melting tank.

17. The glass-melting device for producing glass fibers according to claim 1, further comprising:

an injection container connected to the decompression housing for accommodating solid raw materials to be injected into the first glass-melting tank, which includes a first opening-closing mechanism provided on a side close to an inlet of the solid raw materials and a second opening-closing mechanism provided on a side close to an outlet of the solid raw materials, wherein the first sucking device reduces a pressure in the injection container.

* * * * *